US011320555B2

(12) United States Patent
Mlao et al.

(10) Patent No.: US 11,320,555 B2
(45) Date of Patent: May 3, 2022

(54) SYSTEMS AND METHODS FOR CALIBRATION OF INDETERMINISTIC SUBSURFACE DISCRETE FRACTURE NETWORK MODELS

(71) Applicant: Sim Tech LLC, Katy, TX (US)

(72) Inventors: Jijun Mlao, Katy, TX (US); Wei Yu, Katy, TX (US); Mauricio X. Fiallos Torres, Katy, TX (US); Hongbing Xie, Beijing (CN)

(73) Assignee: Sim Tech LLC, Katy, TX (US)

( * ) Notice: Subject to any disclaimer, the term of this patent is extended or adjusted under 35 U.S.C. 154(b) by 144 days.

(21) Appl. No.: 16/895,650

(22) Filed: Jun. 8, 2020

(65) Prior Publication Data
US 2021/0382193 A1 Dec. 9, 2021

(51) Int. Cl.
G01V 1/30 (2006.01)
E21B 47/026 (2006.01)
G06T 17/20 (2006.01)

(52) U.S. Cl.
CPC .......... G01V 1/306 (2013.01); E21B 47/026 (2013.01); G01V 1/301 (2013.01); G01V 1/307 (2013.01); G06T 17/20 (2013.01)

(58) Field of Classification Search
CPC ........ G01V 1/306; G01V 1/301; G01V 1/307; E21B 47/026; G06T 17/20
See application file for complete search history.

(56) References Cited

U.S. PATENT DOCUMENTS

| 5,992,519 | A | 11/1999 | Ramakrishnan et al. |
| 6,313,837 | B1 | 11/2001 | Assa et al. |
| 7,248,259 | B2 | 7/2007 | Fremming |
| 7,478,024 | B2 | 1/2009 | Gurpinar et al. |
| 7,523,024 | B2 | 4/2009 | Endres et al. |
| 7,542,037 | B2 | 6/2009 | Fremming |
| 7,565,278 | B2 | 7/2009 | Li et al. |
| 10,309,216 | B2 * | 6/2019 | Tueckmantel .......... E21B 49/00 |
| 10,571,605 | B2 * | 2/2020 | Crawford ............... E21B 43/26 |
| 11,015,444 | B2 * | 5/2021 | Hu ........................ E21B 49/006 |
| 2010/0138202 | A1 * | 6/2010 | Mallison ................. G01V 1/18 703/10 |

(Continued)

FOREIGN PATENT DOCUMENTS

| WO | WO2004/049216 | 6/2004 |
| WO | WO2017/030725 | 2/2017 |

OTHER PUBLICATIONS

Hui et al. A Robust Embedded Discrete Fracture Modeling Workflow for Simulating Complex Processes in Field-Scale Fractured Reservoirs, SPE (Year: 2019).*

(Continued)

*Primary Examiner* — Mohammad K Islam
(74) *Attorney, Agent, or Firm* — Victor H. Segura

(57) ABSTRACT

Techniques for calibration of a simulation of a subterranean region having complex fracture geometries. Calibration of indeterministic subsurface discrete fracture network models is performed via non-intrusive embedded discrete fracture modeling formulations applied in conjunction with well testing interpretation and numerical simulation. Subterranean fracture networks are characterized dynamically by embedded discrete fracture modeling to accurately and efficiently determine an optimal fracture model.

24 Claims, 23 Drawing Sheets

(56) References Cited

U.S. PATENT DOCUMENTS

| | | | | |
|---|---|---|---|---|
| 2013/0138406 | A1* | 5/2013 | Khvoenkova | E21B 41/0092 |
| | | | | 703/2 |
| 2014/0076543 | A1* | 3/2014 | Ejofodomi | G01V 1/288 |
| | | | | 166/250.1 |
| 2015/0377005 | A1* | 12/2015 | Garcia-Teijeiro | G01V 1/288 |
| | | | | 703/10 |
| 2016/0108705 | A1* | 4/2016 | Maxwell | E21B 43/267 |
| | | | | 166/250.1 |
| 2018/0203146 | A1* | 7/2018 | den Boer | G01V 1/307 |
| 2019/0309603 | A1* | 10/2019 | Sepehrnoori | E21B 49/00 |
| 2019/0353825 | A1* | 11/2019 | Tene | G01V 99/005 |

OTHER PUBLICATIONS

Wang et al., A review of stimulated reservoir volume characterization for multiple fractured horizontal well in unconventional reservoirs (Year: 2017).*

Lei et al. , a new dfm dynamic modeling workflow through a non-intrusive edfm method to quickly calibrate fracture model with production data: practical application on a granite reservoir case (Year: 2019).*

* cited by examiner

○ Well location
⇔ Connection between matrix cell and matrix cell
◂┄┄▸ NNC 1: Connection between fracture cell and matrix cell
◂┄┄▸ NNC 2: Connection between fracture cell and fracture cell for the same fracture
◂┄┄▸ NNC 3: Connection between fracture cell and fracture cell for different fractures

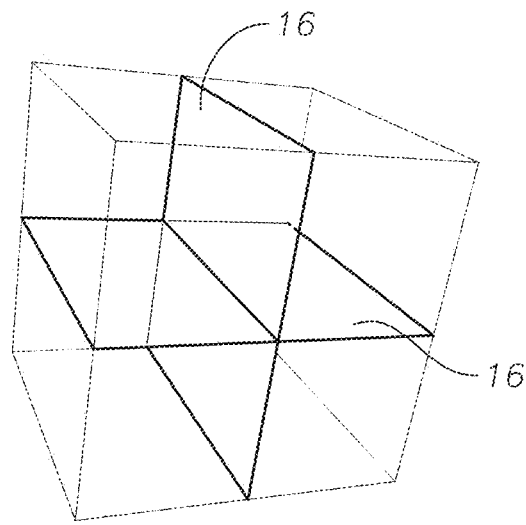
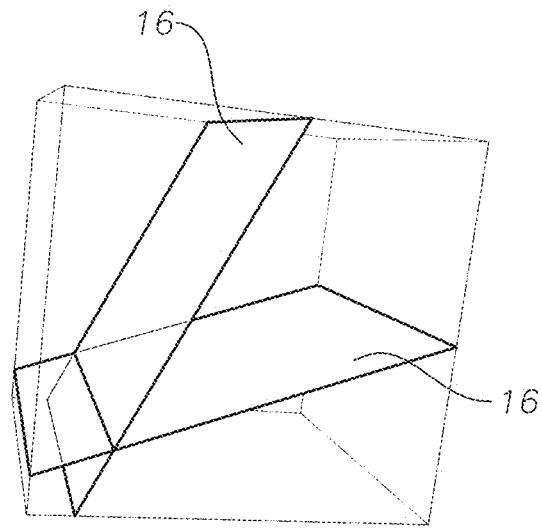
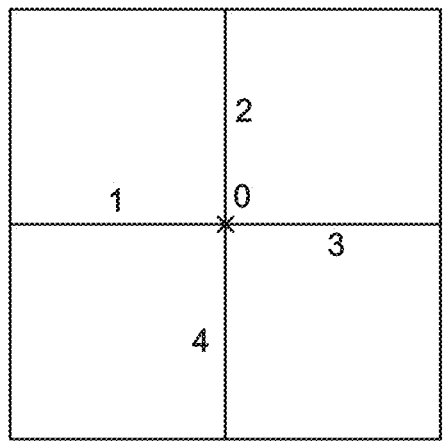
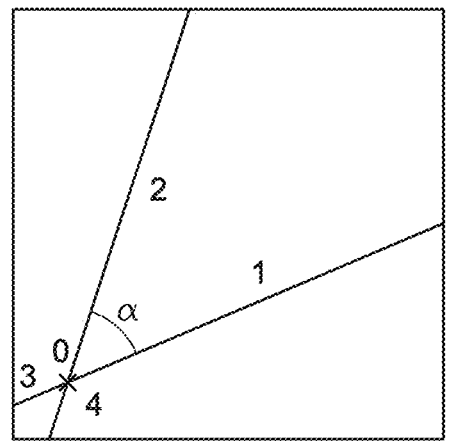
FIG. 4A  FIG. 4B

SYSTEMS AND METHODS FOR CALIBRATION OF INDETERMINISTIC SUBSURFACE DISCRETE FRACTURE NETWORK MODELS

FIELD OF THE INVENTION

The present disclosure relates generally to techniques for the simulation of subterranean regions with fracture geometries. More specifically, the disclosure presents techniques for a calibration workflow applied to the characterization of complex naturally fractured subterranean regions using embedded discrete fracture modelling.

BACKGROUND

The recovery of natural resources (e.g., oil, gas, geothermal steam, water, coal bed methane) from subterranean formations is often made difficult by the nature of the rock matrix in which they reside. Some formation matrices have very limited permeability. Such "unconventional" subterranean regions include shale reservoirs, siltstone, carbonates, dolomites, limestones and sandstone formations. Technological advances in the areas of horizontal drilling and multi-stage hydraulic fracturing have improved the development of unconventional reservoirs.

Hydraulic fracturing is a well stimulation technique used to increase permeability in a subterranean formation. In the fracturing process, a fluid is pumped into casing lining the wellbore traversing the formation. The fluid is pumped in at high pressure to penetrate the formation via perforations formed in the casing. The high-pressure fluid creates fissures or fractures that extend into and throughout the rock matrix surrounding the wellbore. The aim of creating these fractures is so that fluids and gases in the formation can flow more freely through the fractures and into the wellbore casing for recovery to the surface.

With the development of global oil and gas exploitation from fractured reservoirs, assessment of well productivity and field reserves are tremendously affected by consistent characterization of fractures and faults. Natural fractures are considered to play an important role in reservoir production. However, at present the identification, description, and propagation of fractures are highly uncertain. Since the presence of fractures significantly impacts the flow behavior of subterranean fluids and gases, it is important to accurately model or simulate the geometry of the fractures in order to determine their influence on well performance and production optimization.

Modeling these fracture systems signifies a great challenge in terms of determining the parameters of fracture length, aperture, inclination, spatial location, and density. The fracture description in the near-well zone is relatively accurate if restricted by core and logging data. However, the characterization of inter-well fractures is complicated to emulate, resulting in fractures often being randomized and directed to not-so-realistic characterization. Additionally, the trend in spatial propagation is subject to even more uncertainty in upscaling processes.

Conventional fracture modeling in the oil and gas industry uses numerical models based on physical laws to solve for the flow of fluids and predict future performance of subterranean reservoirs. Three-dimensional discrete models are constructed in such a way that the models are consistent with actual measurements taken from the reservoir. Some of these measurements can be included directly in the model at the time of construction. Other measurements, such as those relating to reservoir fluid movement, may be used in an indirect manner, requiring calibration of the model. Fracture modeling has been controlled by continuum approaches like Dual Porosity and Dual Permeability (DPDK) to upscale natural fracture networks. However, most of these DPDK and upscaling approaches cannot resolve the scenario where large-scale fractures exist and/or highly complex geometries dominate fluid-flow path. This happens because these DPDK and upscaling approaches depend on the assumptions that fractures are very-well-connected and uniformly distributed. In that sense, conventional Discrete Fracture Network (DFN) calibration workflows focus only on equivalent permeability and upscaled porosity adjustment and cannot tune other important DFN attributes such as fracture geometries, size (length, height, aperture), orientations, spatial distribution (density), and conductivity. Other modeling methods, such as Local Grid Refinement (LGR) or Unstructured Gridding, often demand very large computational resources for a single-well model.

Thus, a need remains for improved techniques to efficiently and accurately identify representative fracture network models to simulate complex fractured multi-scale subsurface geometries with greater certainty.

SUMMARY

A method for calibrating a simulation of a subterranean region having fracture geometries according to an aspect of the present disclosure includes obtaining discrete fracture network data representing geometrical characteristics of a subterranean region. The discrete fracture network data is calibrated using well test data representing at least one well in the subterranean region. An EDFM formulation is applied to the calibrated discrete fracture network data to produce model data. Fracture shortest paths between multiple points within the discrete fracture network data are identified using the produced model data. A history matching operation is performed to select a data set from the produced model data. A simulation of the subterranean region is generated using the selected data set.

A system for calibration of a simulation of a subterranean region having fracture geometries according to an aspect of the present disclosure includes at least one processor configured to execute computer instructions to perform functions including to: get discrete fracture network data representing geometrical characteristics of a subterranean region; calibrate the discrete fracture network data using well test data representing at least one well in the subterranean region; apply an EDFM formulation to the calibrated discrete fracture network data to produce model data; identify fracture shortest paths between multiple points within the discrete fracture network data using the produced model data; perform a history matching operation to select a data set from the produced model data; and generate a simulation of the subterranean region using the selected data set.

A system for calibration of a simulation of a subterranean region having fracture geometries according to another aspect of the present disclosure includes at least one processor configured to execute computer instructions to perform functions including to: select P10, P50, and P90 scenario data from data representing multiple subterranean single-well discrete fracture networks; calibrate the selected P10, P50, and P90 scenario data using well test data; apply an EDFM formulation to the calibrated P10, P50, and P90 scenario data to produce model data for each scenario; identify fracture shortest paths between multiple points using the produced model data; perform a history matching operation with the P10, P50, and P90 scenarios using well production data; select a data set from the P10, P50, or P90 scenarios with a history matching degree meeting a specified criterion; characterize a multiple-well model using the selected data set; and generate a simulation of the multiple-well model.

BRIEF DESCRIPTION OF THE DRAWINGS

The following figures are included to further demonstrate certain aspects of the present disclosure and should not be used to limit the claimed subject matter. The claimed subject matter may be better understood by reference to one or more of these drawings in combination with the description of embodiments presented herein.

FIG. 4A depicts a schematic of a fracture intersection with all subsegments having similar dimensions according to examples of the present disclosure.

FIG. 4B depicts a schematic of a fracture intersection with a high contrast between the subsegment areas according to examples of the present disclosure.

DETAILED DESCRIPTION

Figure 1A:
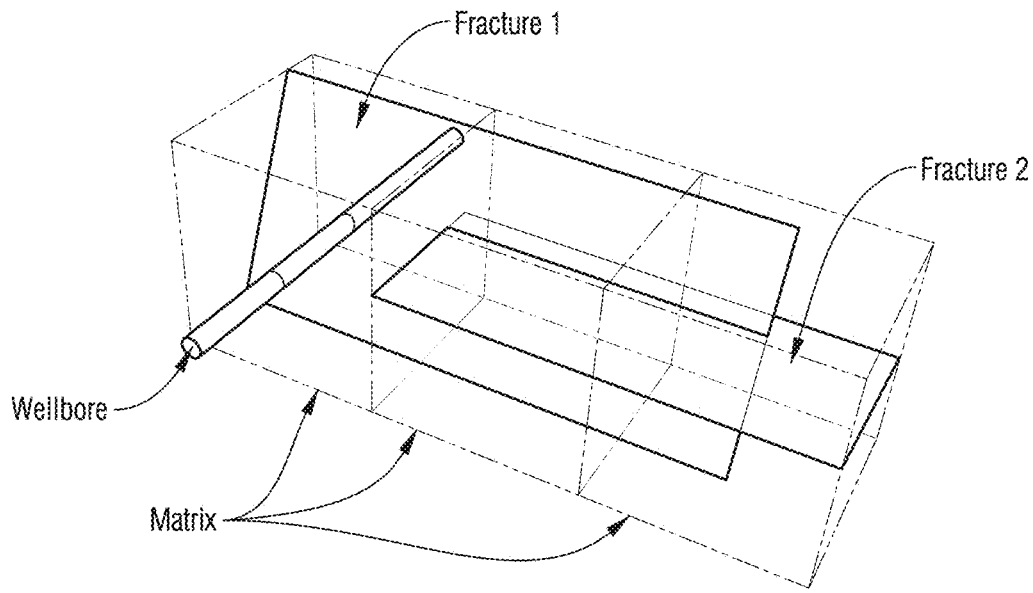
FIG. 1A depicts a schematic of a subsurface physical domain representation using a formulation for handling complex fractures according to an example of the present disclosure.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention. Upon reading this disclosure, many alternative embodiments of the present invention will be apparent to persons of ordinary skill in the art. The scope of the invention is defined by the appended claims and equivalents thereof.

This disclosure presents embodiments applying a non-intrusive Embedded Discrete Fracture Model (EDFM) to adjust sets of DFN with numerical reservoir simulation. The non-intrusive EDFM process can be employed with conventional reservoir simulators to model any DFN system, by which fracture networks can be efficiently and accurately embedded in the configured matrix blocks, without the need to migrate to LGR or unstructured gridding techniques.

A novel workflow is disclosed herein, with a field application in central Asia to model representative DFN in a fractured carbonate reservoir. Using the data of seismic interpretation, logging data, and well testing data, multiple DFN model realizations were translated (more than 30,000 fracture planes) into numerical reservoir modeling by coupling them with an EDFM process. Preliminary screening and fracture connectivity analysis (fracture shortest path identification) was performed by matching the production history of a single-well model. Using seismic data, the DFN was adjusted and propagated, keeping the uniform probability through the model and reducing the fracture model uncertainty.

Embodiments of this disclosure present efficient techniques to model subterranean regions with improved accuracy for simulating fluid flow around complex fracture geometries. Through non-neighboring connections (NNCs), an EDFM formulation is applied to data representing a subterranean region to accurately model or simulate formations with complex geometries such as natural fracture networks and nonplanar fractures. The data representing the subterranean region to be modeled may be obtained by conventional means as known in the art, such as formation evaluation techniques, reservoir surveys, seismic exploration, etc. The subterranean region data may comprise information relating to the fractures, the reservoir, and the well(s), including number, location, orientation, length, height, aperture, permeability, reservoir size, reservoir permeability, reservoir depth, well number, well radius, well trajectory, etc.

Some embodiments utilize data representing the subterranean region produced by conventional reservoir simulators as known in the art (e.g., as described in U.S. Pat. No. 5,992,519 and WO2004/049216). Conventional simulators are designed to generate models of subterranean regions, producing data sets including a matrix grid, fracture parameters, well parameters, and other parameters related to the specific production or operation of the particular field or reservoir. Embodiments of this disclosure provide a non-intrusive application of an EDFM formulation that allows for insertion of discrete fractures into a computational domain and the use of a simulator's original functionalities without requiring access to the simulator source code. The embodiments may be easily integrated into existing frameworks for conventional or unconventional reservoirs to perform various analyses as described herein.

I. EDFM in Conventional Finite-Difference Reservoir Simulators

Embodiments of this disclosure employ an approach that creates fracture cells in contact with corresponding matrix cells to account for the mass transfer between continua. Once a fracture interacts with a matrix cell (e.g. fully or partially penetrating a matrix cell), a new additional cell is created to represent the fracture segment in the physical domain. The individual fractures are discretized into several fracture segments by the matrix cell boundaries. To differentiate the newly added cells from the original matrix cells, these additional cells are referred to herein as "fracture cells."

Figure 1B:
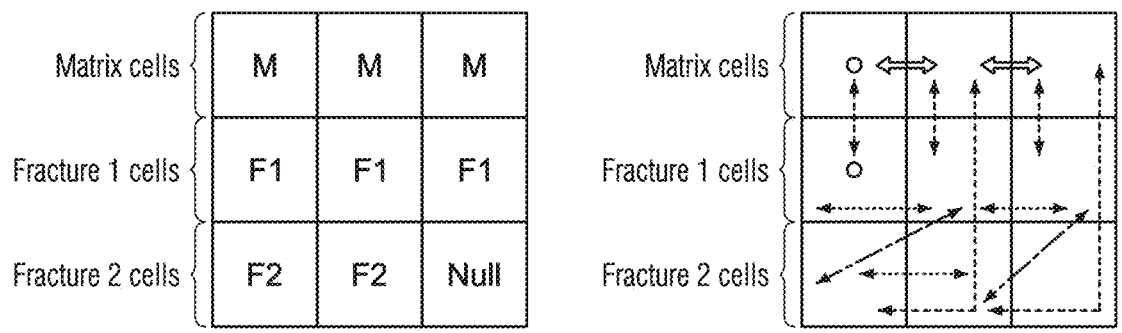
FIG. 1B depicts a schematic of a computational domain using the formulation for handling the representation in FIG. 1A.

FIG. 1A depicts the procedure to add fracture cells in the EDFM using a simple case with only three matrix blocks and two fractures. FIG. 1A depicts the physical domain. FIG. 1B depicts the corresponding computational domain. In this exemplary embodiment, the physical domain includes three matrix cells, two inclined fractures and one wellbore. Before adding the two fractures, the computational domain includes three matrix cells: cell 1 (M), cell 2 (M), and cell 3 (M). After adding the fractures, the total number of cells will increase. Fracture 1 intersects three matrix cells and is discretized into three fracture segments. In the computational domain, three new extra fracture cells are added: cell 4 (F1), cell 5 (F1), and cell 6 (F1). Similarly, fracture 2 intersects two matrix cells and is discretized into two fracture segments. Two new extra fracture cells are added: cell 7 (F2) and cell 8 (F2). Since a structured grid is used in this exemplary embodiment, every row should have the same number of cells, therefore one Null cell is also introduced. The total number of cells increases from three (1×3=3) to nine (3×3=9). The depth of each fracture cell is defined as the depth of the centroid of the corresponding fracture segment. In some embodiments, physical properties (e.g., permeability, saturation, etc.) may be assigned to each fracture cell. For example, an effective porosity value may be assigned for each fracture cell to maintain the pore volume of the fracture segment:

$$\phi_f = \frac{S_{seg} w_f}{V_b}, \tag{1}$$

where $\phi_f$ is the effective porosity for a fracture cell, $s_{seg}$ is the area of the fracture segment perpendicular to the fracture aperture, $w_f$ is the fracture aperture, and $V_b$ is the bulk volume of the cells assigned for the fracture segment.

Some conventional reservoir simulators generate connections between the cells. After adding the new extra fracture cells, the EDFM formulation cancels any of these simulator-generated connections. The EDFM then identifies and defines the NNCs between the added fracture cells and matrix cells. NNCs are introduced to address flow communication between cells that are physically connected but not neighboring in the computational domain. The EDFM calculates the transmissibility based on the following definitions:

a) NNC 1: connection between fracture cell and matrix cell
b) NNC 2: connection between fracture cell and fracture cell for the same fracture
c) NNC 3: connection between fracture cell and fracture cell for different fractures.

These different types of NNCs are illustrated in FIG. 1B. The cells in each NNC pair are connected by transmissibility factors. In addition to these NNCs, the connections between fractures and wells are also introduced by the EDFM. When a fracture segment intersects the wellbore trajectory (as shown in FIG. 1A), a corresponding fracture cell is defined as a well block by adding a well location for this cell as shown in FIG. 1B.

This general procedure may be implemented with conventional reservoir simulators or with other applications that generate similar data sets. As a non-intrusive method, the calculations of connection factors, including NNC transmissibility factors and a fracture well index, depend on the gridding, reservoir permeability, and fracture geometries. Embodiments of this disclosure apply a preprocessor to provide the geometrical calculations. Taking the reservoir and gridding information as inputs, the preprocessor performs the calculations disclosed herein and generates an output of data values corresponding to fracture locations, connectivity parameters, geometry parameters, the number of extra grids, the equivalent properties of these grids, transmissibility factors, and NNC pairings. Embodiments of the preprocessor may be developed using conventional programming languages (e.g., PYTHON™, FORTRAN™, C, C++, etc.). Additional description regarding the preprocessor is provided below.

II. Calculation of NNC Transmissibility and Fracture Well Index

Figure 2:
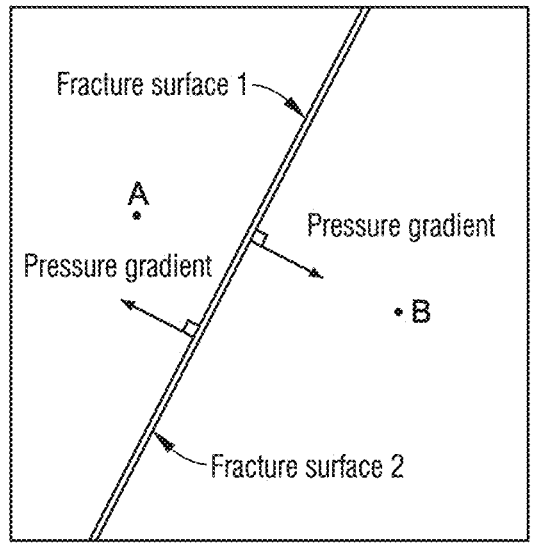
FIG. 2 depicts a schematic of a connection between a fracture cell and a matrix cell according to examples of the present disclosure.

Matrix-Fracture Connection. The NNC transmissibility factor between a matrix and fracture segment depends on the matrix permeability and fracture geometry. When a fracture segment fully penetrates a matrix cell, if one assumes a uniform pressure gradient in the matrix cell and that the pressure gradient is normal to the fracture plane as shown in FIG. 2, the matrix-fracture transmissibility factor is $$T_{f-m} = \frac{2A_f(K \cdot \vec{n}) \cdot \vec{n}}{d_{f-m}}, \quad (2)$$

where $A_f$ is the area of the fracture segment on one side, K is the matrix permeability tensor, $\vec{n}$ is the normal vector of the fracture plane, $d_{f-m}$ is the average normal distance from matrix to fracture, which is calculated as $$d_{f-m} = \frac{\int_V x_n \, dV}{V}, \quad (3)$$

where V is the volume of the matrix cell, dV is the volume element of matrix, and $x_n$ is the distance from the volume element to the fracture plane. A more detailed derivation of Equation (2) is provided in Appendix A.

If the fracture does not fully penetrate the matrix cell, the calculation of the transmissibility factor should take into account that the pressure distribution in the matrix cell may deviate from the previous assumptions. In order to implement a non-intrusive process, one can assume that the transmissibility factor is proportional to the area of the fracture segment inside the matrix cell.

Figure 3:
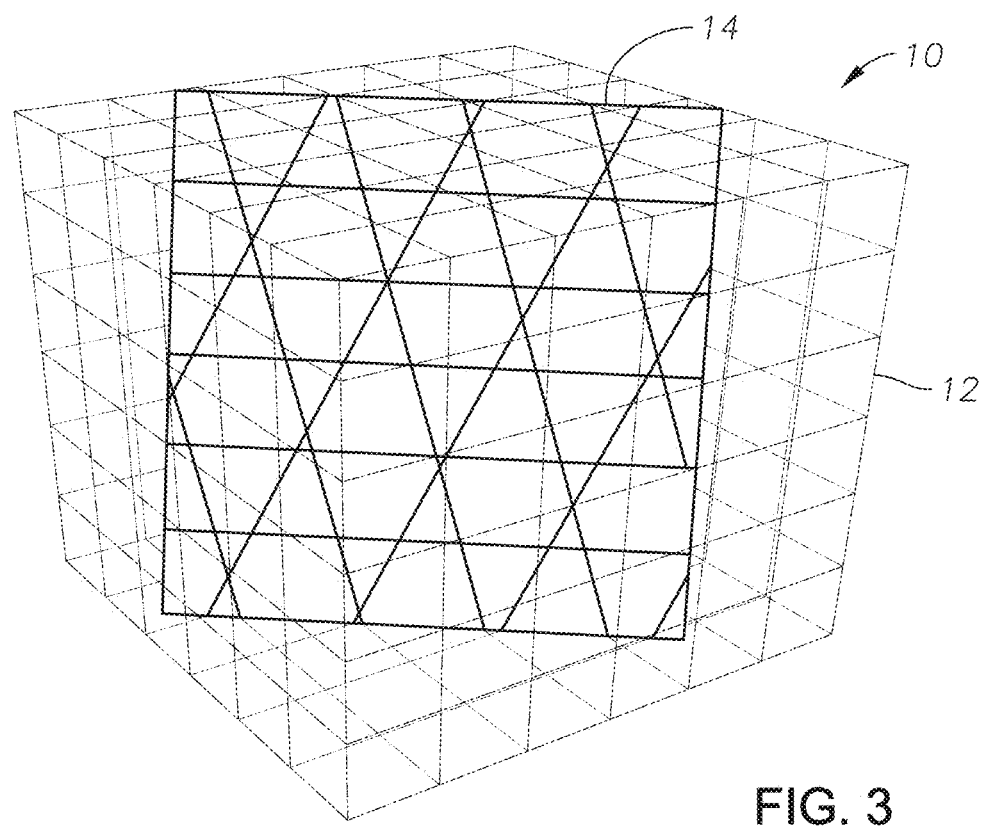
FIG. 3 depicts a 3D reservoir model using a structured grid with an inclined fracture according to examples of the present disclosure.

Connection between Fracture Segments in an Individual Fracture. FIG. 3 depicts a 3D reservoir model 10 using a structured grid 12, with one inclined fracture 14. As depicted, a fracture 12 can be discretized into many small fracture segments by the boundary of the matrix cells. Each fracture segment can have a different geometric shape, including trilateral, quadrilateral, pentagons, and hexagons.

Thus, the connection between these segments is a 2D unstructured grid problem. To facilitate the implementation of conventional simulators, a simplified approximation may be adopted. The transmissibility factor between a pair of neighboring segments, 1 and 2, is evaluated using a two-point flux approximation scheme as $$T_{seg} = \frac{T_1 T_2}{T_1 + T_2}, \quad (4a)$$

$$T_1 = \frac{k_f A_c}{d_{seg1}}, \; T_2 = \frac{k_f A_c}{d_{seg2}}, \quad (4b)$$

where $k_f$ is the fracture permeability, $A_c$ is the area of the common face for these two segments, $d_{seg1}$ and $d_{seg2}$ are the distances from the centroids of segments 1 and 2 to the common face, respectively. This two-point flux approximation scheme may lose some accuracy for 3D cases where the fracture segments may not form orthogonal grids. When the flow in the fracture plane becomes vital for the total flow, a multi-point flux approximation may be applied. In some embodiments, the EDFM preprocessor calculates the phase independent part of the connection factors, and the phase dependent part is calculated by the simulator.

Fracture Intersection. FIG. 4A and FIG. 4B depict sample fracture 16 intersections in a 3D view (upper) and 2D view (lower). At intersections, the fractures 16 can be divided into two subsegments. In FIG. 4A, all of the subsegments have similar dimensions. In FIG. 4B, there is high contrast between areas of the subsegments. A transmissibility factor is assigned between intersecting fracture segments to approximate the mass transfer at the fracture intersection. The transmissibility factor is calculated as $$T_{int} = \frac{T_1 T_2}{T_1 + T_2}, \quad (5a)$$

$$T_1 = \frac{k_{f1} w_{f1} L_{int}}{d_{f1}}, \; T_2 = \frac{k_{f2} w_{f2} L_{int}}{d_{f2}}, \quad (5b)$$

where $L_{int}$ is the length of the intersection line. $d_{f1}$ and $d_{f2}$ are the weighted average of the normal distances from the centroids of the subsegments (on both sides) to the intersection line.

In FIGS. 4A and 4B, $$d_{f1} = \frac{\int_{S_1} x_n dS_1 + \int_{S_3} x_n dS_3}{S_1 + S_3} \quad (6)$$

$$d_{f2} = \frac{\int_{S_2} x_n dS_2 + \int_{S_4} x_n dS_4}{S_2 + S_4}, \quad (7)$$

where $dS_i$ is the area element and $S_i$ is the area of the fracture subsegment i. $x_n$ is the distance from the area element to the intersection line. It is not necessary to perform integrations for the average normal distance. Since the subsegments are polygonal, geometrical processing may be used to speed up the calculation.

Well Fracture Intersection. Well-fracture intersections are modeled by assigning an effective well index for the fracture segments that intersect the well trajectory, as $$WI_f = \frac{2\pi k_f w_f}{\ln\left(\frac{re}{rw}\right)}, \quad re = 0.14\sqrt{L_s^2 + H_s^2}, \tag{8}$$

where $k_f$ is the fracture permeability, $w_f$ is the fracture aperture, $L_s$ is the length of the fracture segment, $H_s$ is the height of the fracture segment, re is the effective radius, and rw is the wellbore radius.

III. Modeling of Complex Fracture Geometries

Nonplanar Fracture Geometry. Mathematically, the pre-processor calculates the intersection between a plane (fracture) and a cuboid (matrix cell). To account for the complexity in fracture shape, the EDFM may be extended to handle nonplanar fracture shapes by discretizing a nonplanar fracture into several interconnected planar fracture segments. The connections between these planar fracture segments may be treated as fracture intersections.

For two intersecting fracture segments, if the two sub-segments have small areas (as depicted in FIG. 4B, $S_3 \to 0$, $S_4 \to 0$), the transmissibility factor between the fracture segments is primarily determined by subsegments with larger areas. In Equation 6, we will have $$d_{f1} = \frac{\int_{S_1} x_n dS_1}{S_1}, \quad d_{f2} = \frac{\int_{S_2} x_n dS_2}{S_2}. \tag{9}$$

Figure 5:
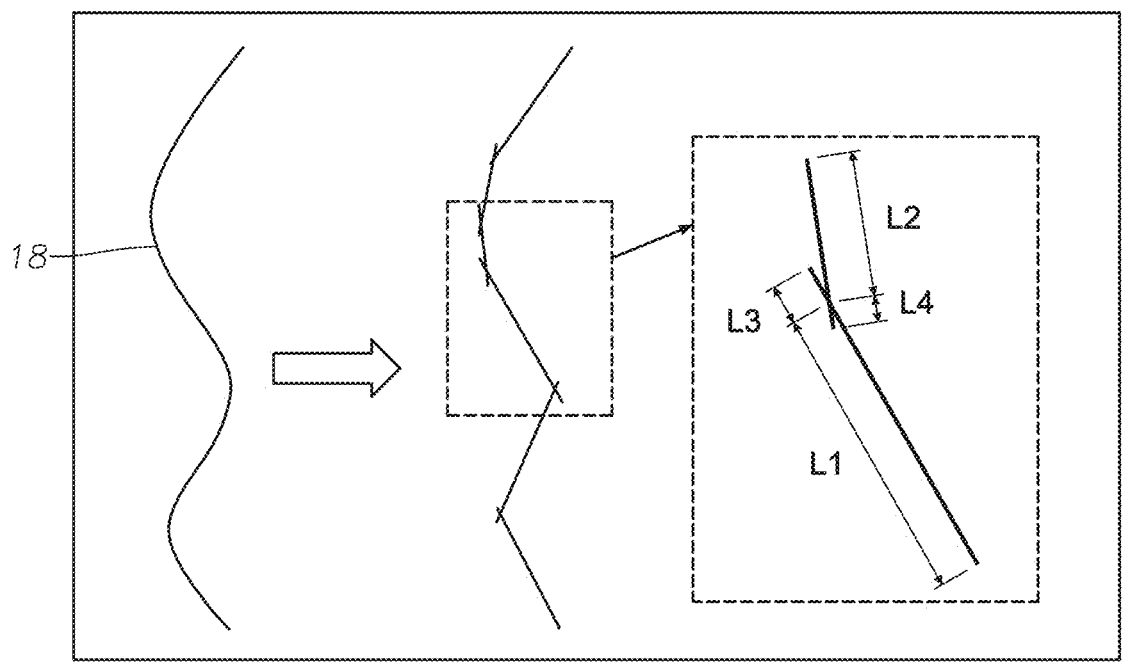
FIG. 5 depicts a schematic of the modeling of a nonplanar fracture according to examples of the present disclosure.

The formula for this intersecting transmissibility factor calculation ($T_{int}$) has the same form as that used for two fracture segments in an individual fracture (Equation 4a), with the permeability and the aperture of the two intersecting fractures being the same. This approach is used to model nonplanar fractures. FIG. 5 depicts how EDFM embodiments handle nonplanar fractures 18. The fracture 18 is discretized into six interconnected planar fractures. For each intersection, the ratios of L1/L3 and L2/L4 should be high enough to eliminate the influence of the small subsegments. In an exemplary embodiment, the ratios are set as 100.

Figure 6:
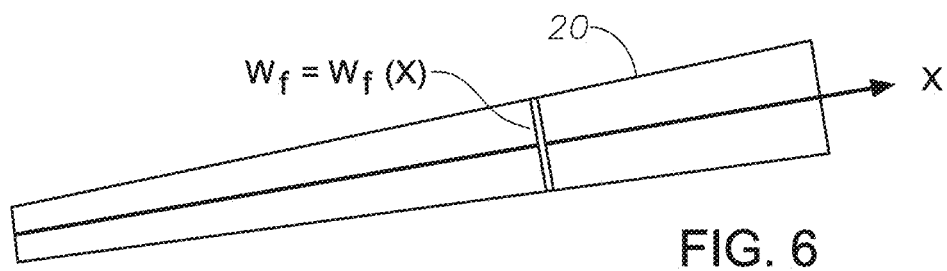
FIG. 6 depicts a 2D schematic of a fracture segment with varying aperture according to examples of the present disclosure.

Fractures with Variable Aperture. A fracture with variable apertures is modeled with the EDFM by discretizing it into connecting segments and assigning each segment an "average aperture" ($\overline{w_f}$) and "effective permeability" ($k_{f,eff}$). FIG. 6 shows a 2D case where a fracture 20 segment has a length of $L_s$ with variable aperture and x is the distance from a cross section to one end of the fracture segment. The aperture is a function of x. The total volume of the segment is $$V_{seg} = H \int_0^{L_s} w_f(x) dx, \tag{10}$$

where H is the height of the fracture segment. The average aperture to calculate the volume should be $$\overline{w_f} = V_{seg}/HL_s = \frac{1}{L_s}\int_0^{L_s} w_f(x) dx. \tag{11}$$

For transmissibility calculation, assuming the cubic law for fracture conductivity, $$C_f(x) = k_f(x)w_f(x) = \lambda w_f^3(x), \tag{12}$$

where $\lambda$ is $1/12$ for smooth fracture surfaces and $\lambda < 1/12$ for coarse fracture surfaces. For the fluid flow in fractures, based on Darcy's law, $$Q_j = HC_j(x)\lambda_j \frac{dP}{dx}, \tag{13}$$

where $Q_j$ is flow rate of phase j and $\lambda_j$ is the relative mobility of phase j. For each fracture segment, assuming constant $Q_j$, the pressure drop along the fracture segment is $$\Delta p = \int_0^{L_s} \frac{Q_j}{HC_f(x)} dx. \tag{14}$$

To keep the pressure drop constant between both ends of the segments, an effective fracture conductivity can be defined which satisfies the following equation:

$$\int_0^{L_s} \frac{Q_j}{HC_j(x)} dx = \int_0^{L_s} \frac{Q_j}{HC_j^{eff}(x)} dx, \tag{15}$$

which gives $$C_f^{eff} = \frac{L_s}{\int_0^{L_s} \frac{dx}{C_f(x)}} = \frac{L_s}{\int_0^{L_s} \frac{dx}{\lambda w_f^3(x)}}. \tag{16}$$

Since the fracture conductivity is the product of fracture aperture and fracture permeability, if $\overline{w_f}$ is used for the whole fracture segment, an effective fracture permeability $k_{f,eff}$ is required to calculate the conductivity:

$$k_{f,eff} = C_f^{eff}/\overline{w_f} = \frac{L_s^2}{\left(\int_0^{L_s} w_f(x)dx\right)\left(\int_0^{L_s} \frac{dx}{\lambda w_f^3(x)}\right)}. \tag{17}$$

Similarly, assuming constant fracture permeability but varying aperture, the effective fracture permeability should be $$k_{f,eff} = \frac{L_s^2}{\left(\int_0^{L_s} w_f(x)dx\right)\left(\int_0^{L_s} \frac{dx}{k_f w_f(x)}\right)}. \tag{18}$$

Figure 7A:
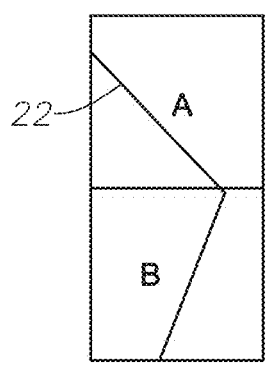
FIG. 7A depicts a 2D schematic of small fracture segments in a matrix grid according to examples of the present disclosure.
Figure 7B:
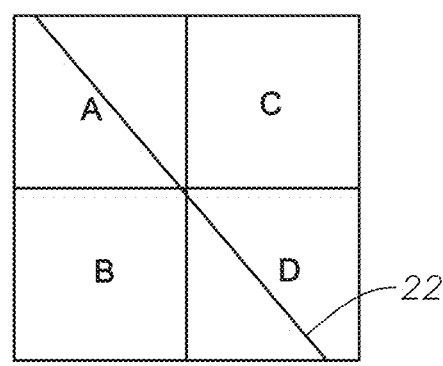
FIG. 7B depicts another 2D schematic of small fracture segments in a matrix grid according to examples of the present disclosure.

Special Handling of Extra Small Fracture Segments. The discretization of fractures by cell boundaries may generate some fracture segments with extremely small volumes. This happens frequently when modeling complex fracture geometries, where a large number of small fractures are used to represent the nonplanar shape and variation in aperture. These small control volumes may cause problems in pre-conditioning and they limit the simulation time step to an unreasonable value. Simply eliminating these segments may cause the loss of connectivity as depicted in FIGS. 7A and 7B. Lines 22 represent the fracture segments. In both FIGS. 7A and 7B, removing the fracture segment in Cell B will lead to loss of connectivity. For a fracture segment with extra small volume, if N denotes the number of NNCs related to this fracture segment, $C_1, C_2, \ldots C_N$ denotes the cells connected to this segment by NNC, and $T_1, T_2, \ldots T_N$ denotes the NNC transmissibility factor related to these connections, then the small segment can be eliminated as follows:

a) Remove the cell for this segment in the computational domain and eliminate all NNCs related to this cell.

b) Add N(N−1)/2 connections for any pair of cells in $C_1$, $C_2 \ldots C_N$, and the transmissibility between $C_i$ and $C_j$ is $$T_{i,j} = \frac{T_i T_j}{\sum_{k=1}^{N} T_k}. \tag{19}$$

This special case method eliminates the small control volumes while keeping the appropriate connectivity. However, for multiphase flow an approximation is provided as only the phase independent part of transmissibility is considered in the transformation. This method may also cause loss of fracture-well connection if applied for fracture segments with well intersections. Since this method ignores the volume of the small fracture segments, it is most applicable when a very high pore volume contrast (e.g. 1000) exists between fracture cells.

IV. DFN Calibration Workflow

Aspects of this disclosure integrate EDFM's fracture-modeling capabilities with a DFN calibration workflow to achieve the optimal or most representative model in simulations of complex fracture subsurface geometries. As previously described, EDFM processing allows fractures to be integrated in a virtual-like manner in any fashion/location within a reservoir model, producing a robust and useful system parameterization. The calculated connection factors and indices only depend on the geometry and conductivity of the rock matrix and fractures. In other words, the NNCs are phase and component independent, allowing EDFM formulations to be a non-intrusive process that can be implemented with conventional simulators with the calculations run in an external environment independent of the simulator's source code.

Embodiments of this disclosure implement a workflow which incorporates static data (e.g., core description, well logging and seismic interpretation results) along with well testing interpretation and actual production data, leading to a narrower screening of the fracture system model which improves the reliability of fracture prediction and reduces the workload of reservoir engineers. Following is a workflow for some embodiments of this disclosure:

a) After the geological model is generated, multiple single-well DFNs are established after processing core, well logging data, and seismic interpretation results. Then, P10, P50 and P90 simulation scenarios are selected for posterior calibration. These steps may be performed using conventional simulators and algorithms as known by those skilled in the art.

b) Using the well testing interpretation data regarding permeability estimation and boundary radius in the near and far areas from the wellbore, single-well DFN geological models are recalibrated and restrained relating to effective transmissibility properties.

c) The EDFM formulation is applied in order to couple the static and fracture models with the reservoir simulator. Hence, EDFM processing, which improves the computational efficiency of the numerical model and the precision of fracture characterization as described herein, is employed to model each single-well DFN scenario.

d) Modeled fractures by EDFM are subject to a connectivity analysis which is focused on finding the shortest path within the DFN between two explicit fracture connections. This feature aids to calibrate specific dominant fracture properties to mimic the dynamic behavior of the wells (production). In this workflow, the proposed routine for this connectivity analysis is intended to determine the shortest fracture paths for water intrusion phenomena between the wellbore and the water contact in the reservoir.

e) The calibration process involves assigning properties to the model and then verifying that the solutions computed with the simulator are consistent with the geological measurements (commonly referred to as "history matching"). Single-well numerical simulation is performed in order to test the effect of the geological model configuration on the history matching of the production data without modifying any geological or fracture parameter. Through this process, production data is employed to improve the reliability of the geological model and the DFN characterization, and to reduce the history matching workload of the model with an earlier calibration of the modeling parameters. This calibration process is iterative and stops when the model is able to replicate the observations to meet specified or predetermined tolerance criteria. Embodiments may be implemented with the matching criteria specified or predetermined as desired. For example, embodiments may be implemented such that the geological model with a matching degree of at least 30%, 50%, 70%, or 80% is accepted to continue the workflow. In this manner, the selected model will be more in line with the actual geosystem structure that supports the observed single-well field production data.

f) Based on the selected history matching results from the numerical simulation of the single-well model, seismic interpretation results are used to extend a similar configuration of the fractures characterization to a larger model that includes multiple wells, resulting in a more comprehensive model which accounts for multiple well interactions.

Figure 8:
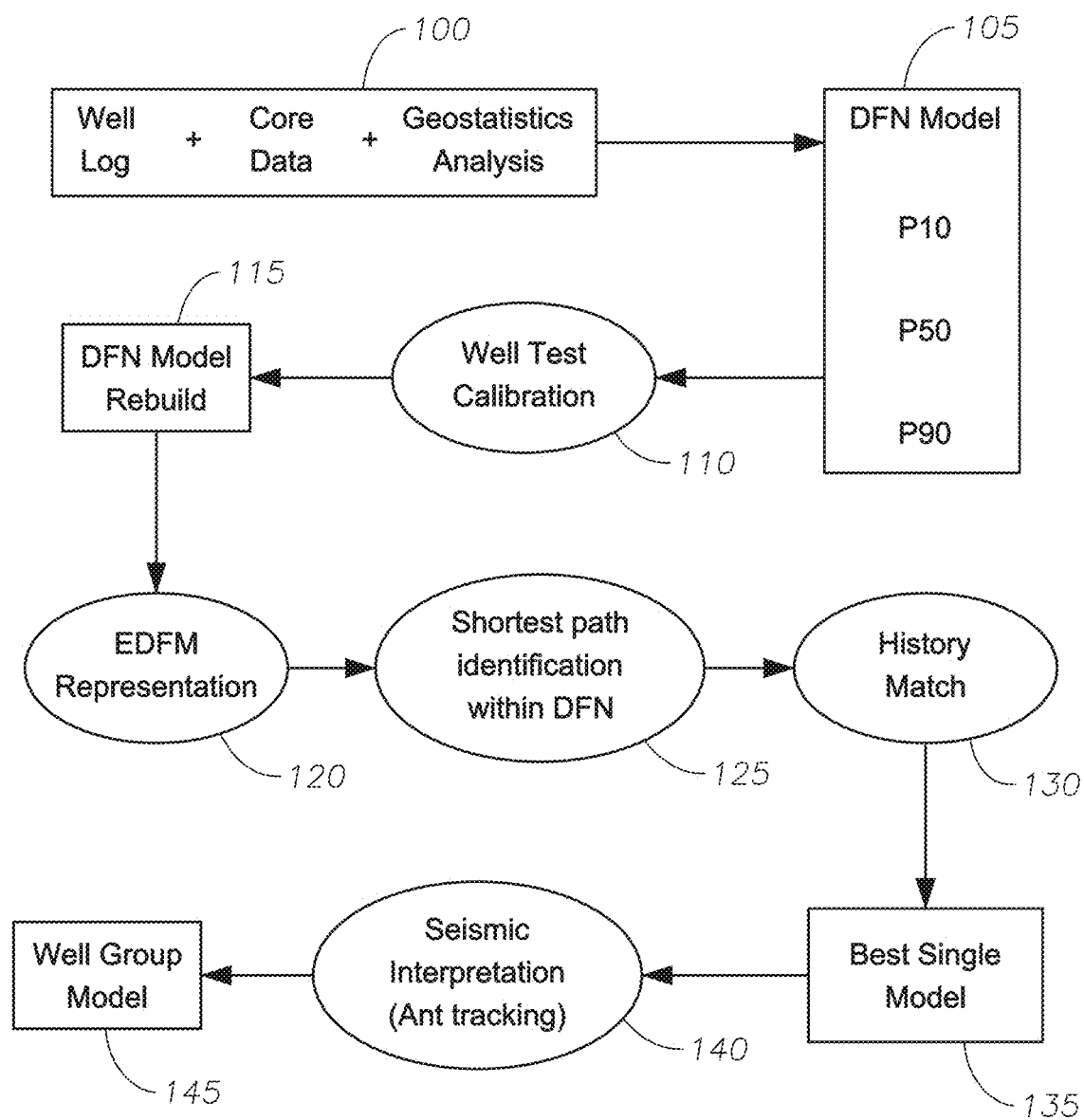
FIG. 8 shows a flow diagram illustrating a model calibration workflow according to examples of the present disclosure.

FIG. 8 depicts a flow chart of a sample embodiment of this disclosure. An integrated framework of DFN calibration workflow begins with the available geological data (e.g., core description, logging data, seismic interpretation results, geostatistics analysis, etc.) 100. The geological data is used to generate P10, P50 and P90 DFN scenarios in a single-well geological model 105. The single-well DFN geological model 105 is constrained based on the results of well-test data interpretation (e.g. focused on the transmissibility of near well and far well area) 110, producing DFN models 115. Next, an EDFM formulation is used to characterize the fractures of DFN models 120 in a reservoir simulator. The shortest paths between fracture connections are identified within the DFN to characterize water intrusion 125. A history matching operation 130 is then performed on the single-well models. Models meeting an established history matching criterion (e.g. a matching degree of 70% or greater) are selected to continue to the next stage as the best single-well model 135. Seismic interpretation results (such as sedimentary microphases and ant tracking) 140 are used to upscale the DFN model 135 group to simulate a multiple well level model 145.

V. Field Application

An embodiment of this disclosure was implemented and applied to a carbonate rock gas reservoir in Asia, where there exist natural fractures of various dimensions in the reservoir area. The matrix is characterized by low porosity and low permeability, and the fracture networks are the main outflow channel for the fluid to flow. The embodiment was applied to characterize and produce a simulation of the fracture networks in the studied region. A total of 3 gas wells (1 vertical well, 2 large deviated wells) are included in the work area. From these wells, the vertical one provides most of the information (including core analysis, well logging, seismic, well test, and other data). The field application of an embodiment of this disclosure for generating, calibrating, and extending (upscaling) the geological and DFN model of a single well to the entire multiple well area was implemented as follows.

Single-Well DFN Model Generation.

Figure 9:
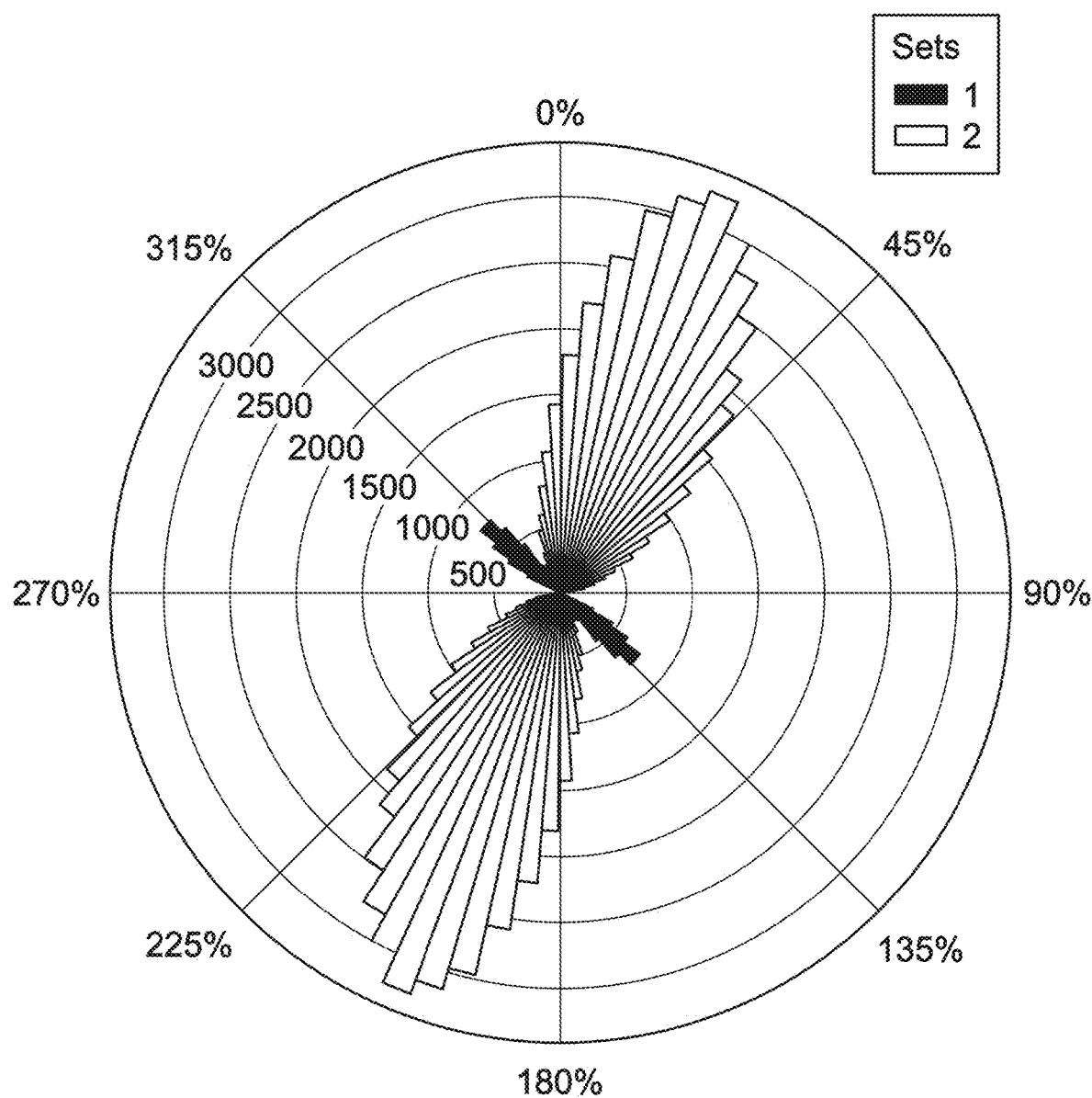
FIG. 9 depicts a diagram representing the direction of fractures in a subterranean reservoir according to examples of the present disclosure.
Figure 10B:
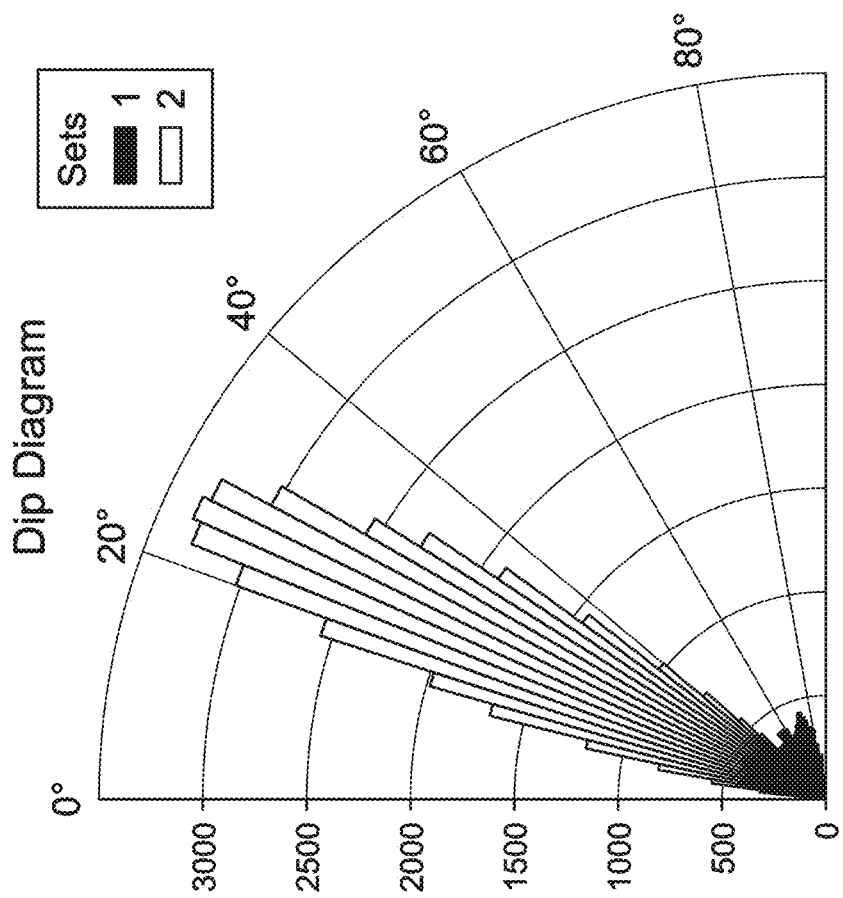
FIG. 10B depicts a well fracture dip diagram according to examples of the present disclosure.
Figure 10A:
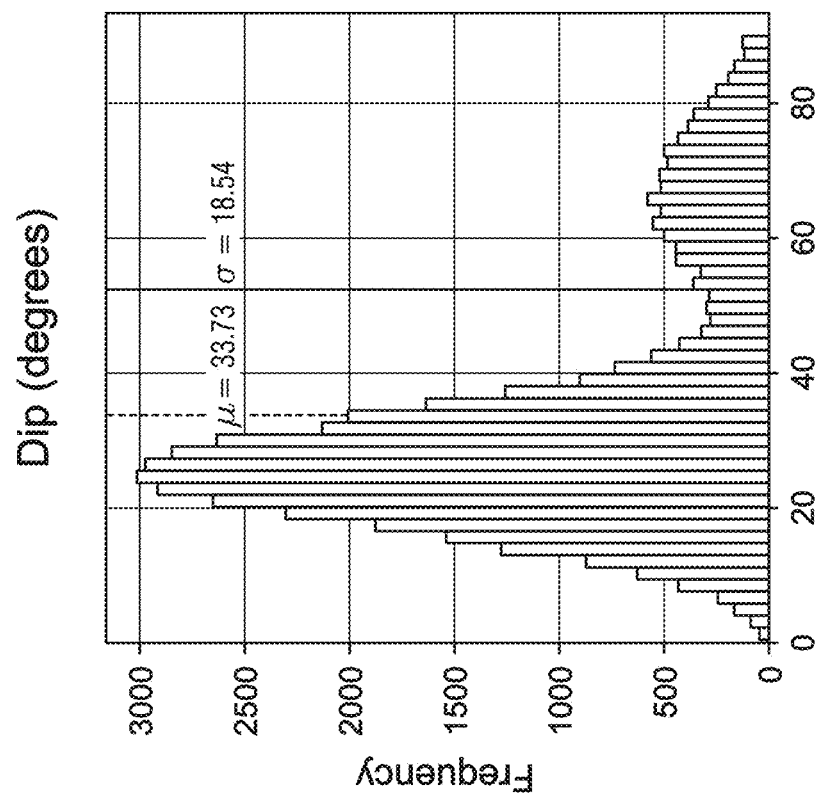
FIG. 10A depicts a well fracture dip inclination histogram according to examples of the present disclosure.

From the wellbore, fracture types (hierarchy by aperture) were identified and characterized using conventional openhole logs, borehole image interpretations, dynamic (well test) and static data (outcrops and cores). Next, a distribution of petrophysical properties and fractures was performed in a single-well model. The fracture network from the well B-1 reservoir, which was generated from imaging logging data, exhibit a strike direction of mainly north-east, south-west, as shown in FIG. 9. FIG. 10A shows the well fracture dip inclination histogram. FIG. 10B shows the well fracture dip diagram. The inclination of the fracture exhibits a double-peak distribution, including a set of low-angle inclination of 20 to 40 degrees and a set of high-angle inclination of 60 to 80 degrees, with an average fracture inclination of 33 degrees.

Figure 11:
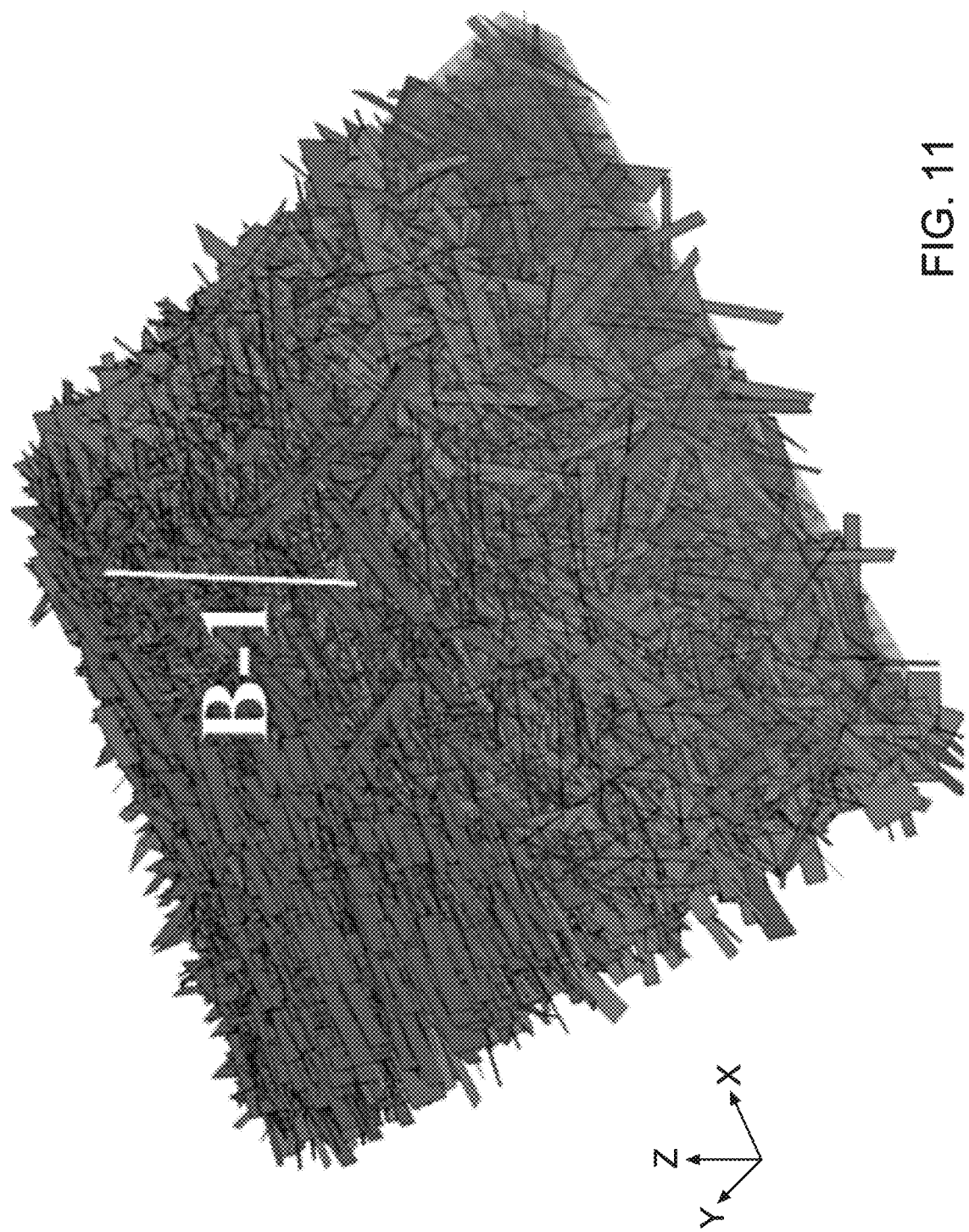
FIG. 11 depicts a discrete fracture network model of a subterranean region according to examples of the present disclosure.

Based on the seismic interpretation results, which are normally employed to determine the distribution of large-scale fractures (faults), and on the randomly generated ant tracking results, multiple stochastic realizations of DFN models for the single well B-1 were generated and their P10, P50, and P90 models were identified and modeled. The P10 (including 13,833 fractures), P50 (including 22257 fractures), and P90 (including 67135 fractures) scenarios were produced after using core description, well logging, and seismic interpretation. FIG. 11 shows the P10 DFN model of well B1. The fractures are darker in the figure compared to the matrix blocks.

Model Calibration of DFN with Well Testing.

Figure 12A:
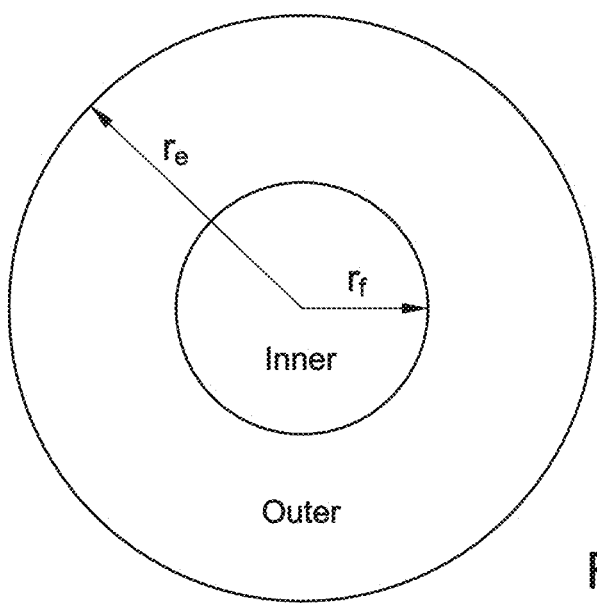
FIG. 12A depicts a diagram of a well test model according to examples of the present disclosure.
Figure 12B:
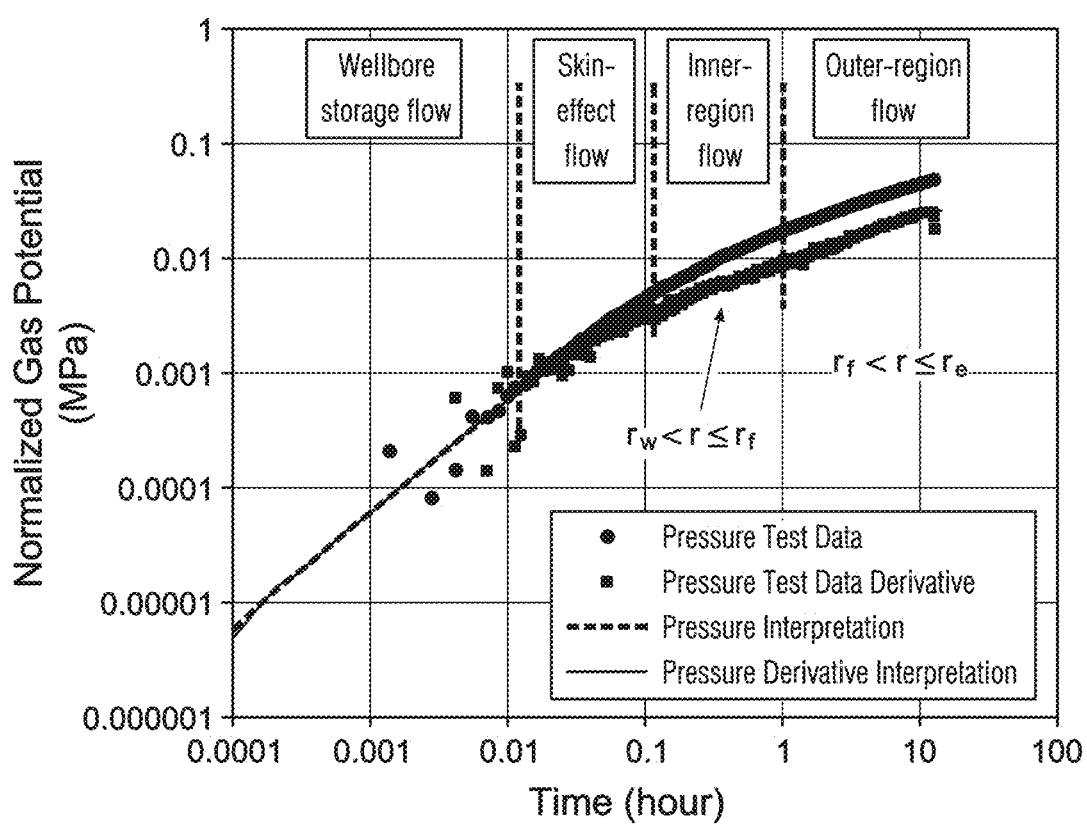
FIG. 12B depicts a plot of type-curve matches on buildup data of a well according to examples of the present disclosure.

Since the radial composite model can be solved analytically, and it can be employed to roughly reflect the property changes of the near-well region caused by stimulation, the fractured well-radial composite model is selected to interpret the build-up pressure data of well B-1. FIG. 12A shows the well test model. FIG. 12B shows that the flow regimes obtained from the well testing interpretation can be divided into the wellbore storage flow, the skin-effect flow ($r \leq rw$), inner-region flow ($rw < r \leq rf$), and outer-region flow ($rf < r \leq re$).

By performing a series of type-curve matches, the estimated parameters are obtained for calibrating the DFN model. The results of the parameter evaluation are shown in Table 1.

TABLE 1

Estimated parameters obtained from type-curve match on Buildup data of Well B-1.

| Parameter | Value | Unit |
|---|---|---|
| Inner permeability | 980 | md |
| Outer permeability | 7.62 | md |
| Inner radius | 50.0112 | m |
| Wellbore storage coefficient | 6244.28 | m$^3$/MPa |
| Thickness | 113 | m |
| Porosity | 0.08 | — |
| Initial reservoir pressure | 54.086 | MPa |

Single Well Model DFN Numerical Characterization.

Figure 13:
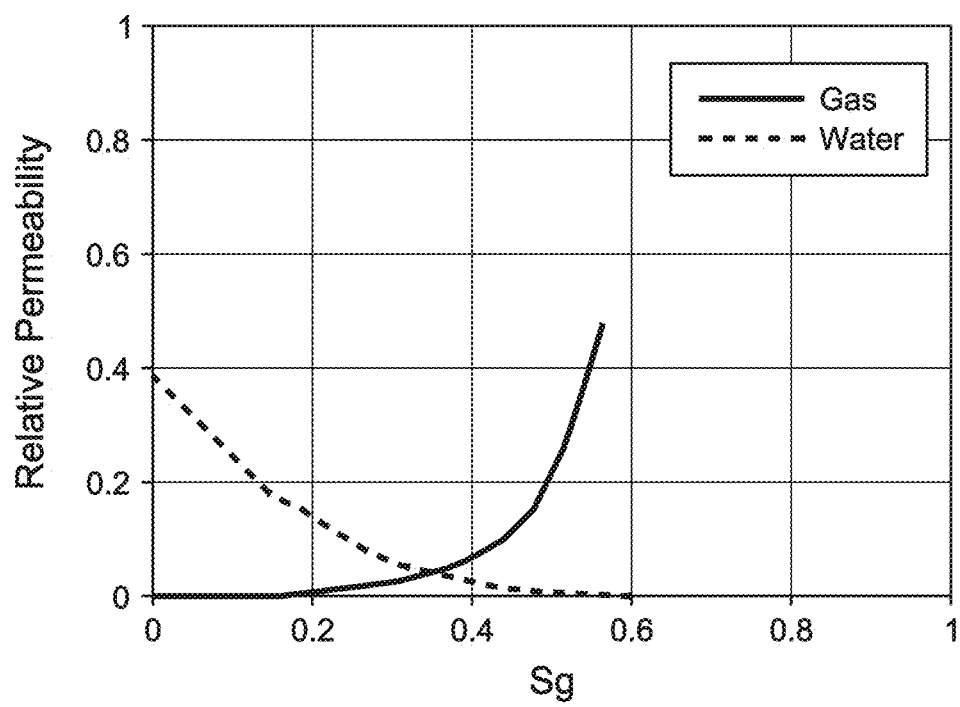
FIG. 13 depicts a plot of a matrix relative permeability curve in a gas water system according to examples of the present disclosure.
Figure 14:
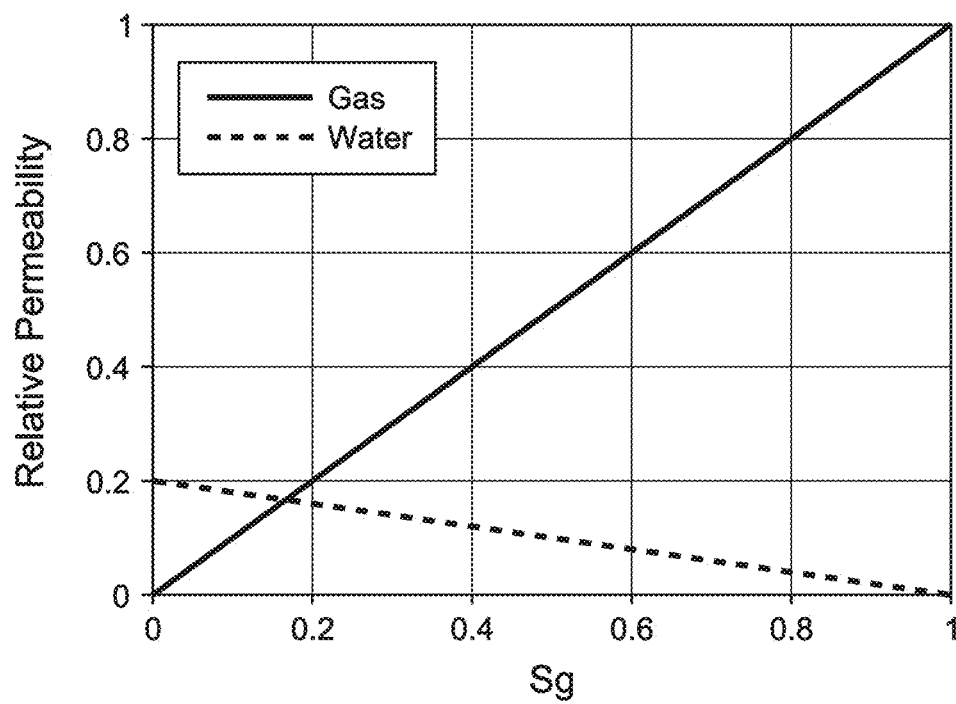
FIG. 14 depicts a plot of a fracture relative permeability curve in a gas water system according to examples of the present disclosure.

As previously described, multiple DFN stochastic realizations, with miscellaneous fracture intensity numbers, were directly embedded into the reservoir single-well models through the EDFM formulation. The different parameters employed to modify these initial models progressively were constrained by geophysical and geological data and interpretation, as well as by well testing interpretation values of the transmissibility. Basic reservoir and fluid properties are summarized in Table 2. The employed matrix relative permeability curve in a gas-water system is depicted in FIG. 13. The employed fracture relative permeability curve in a gas-water system is depicted in FIG. 14.

TABLE 2

Summary of basic reservoir and fluid parameters used for initialization in the study.

| Reservoir Description | Value | Unit |
|---|---|---|
| Model dimension (x × y × z) | 4000 × 4000 × 200 | m |
| Initial reservoir pressure | 57.3 | MPa |
| Reservoir horizontal permeability | 0.1 | mD |
| Reservoir vertical permeability | 0.01 | mD |
| Reservoir porosity | 8% | — |
| Total compressibility | $2.2 \times 10^{-6}$ | bar$^{-1}$ |
| Reservoir depth | 2800-3000 | m |
| Reservoir thickness | 200 | m |
| Gas-Water contact | 2940 | m |
| Water density | 1054 | kg/m$^3$ |
| Gas density | 0.7602 | kg/m$^3$ |
| Rock compressibility | $2.238 \times 10^{-4}$ | bar$^{-1}$ |

Figure 15:
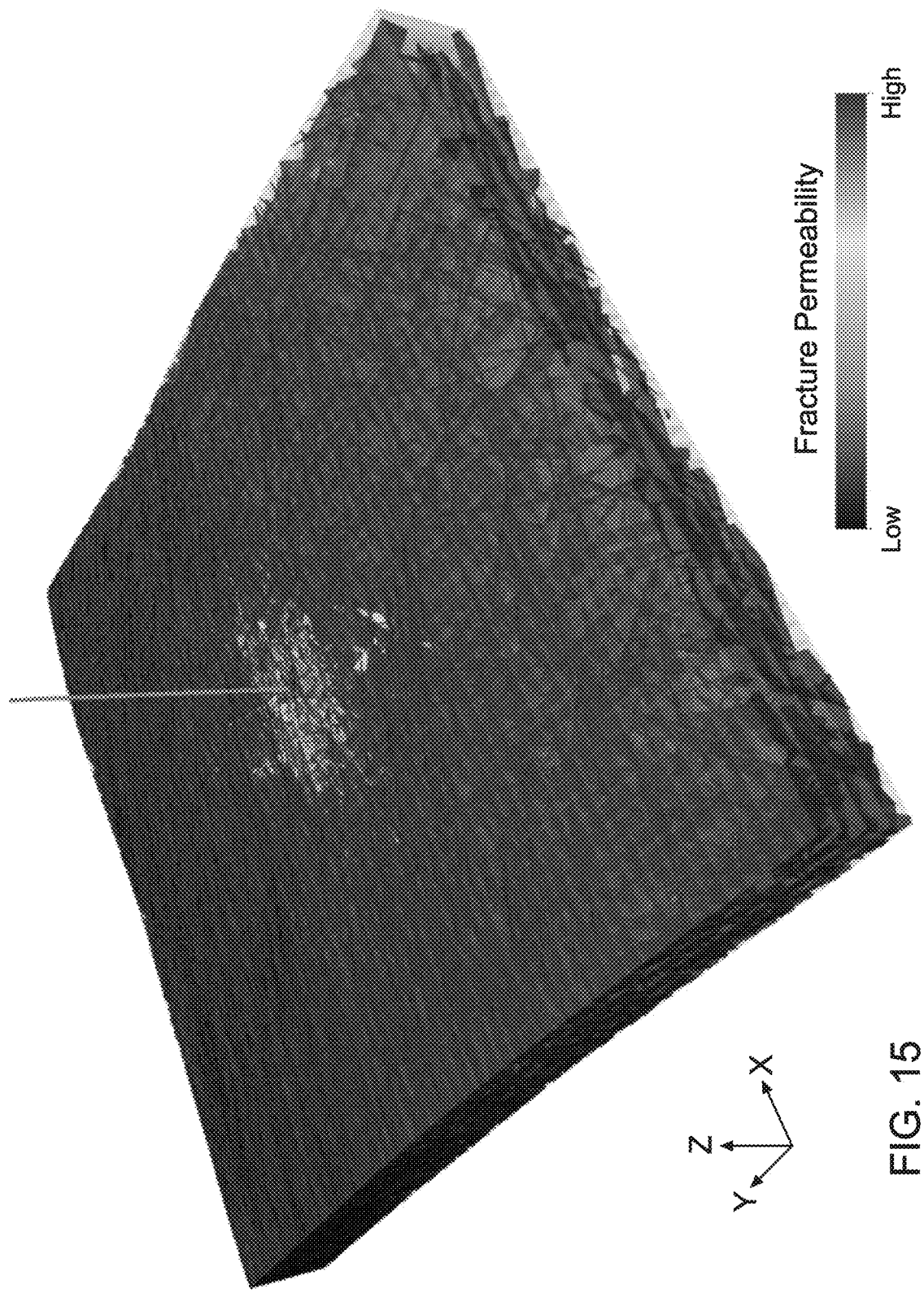
FIG. 15 depicts a 3D schematic of a discrete fracture network of a single-well model after EDFM characterization according to examples of the present disclosure.

Since modeling reservoir fracture networks in a natural fractured oil and gas reservoir can demand a large amount of work and great uncertainty, DFN characterization has been enhanced by applying the non-intrusive EDFM methodology in the field application. By easily inserting the fracture networks into the matrix mesh and introducing NNCs to handle the complex flow of fluids among the matrix grid and the natural fractures through the EDFM process, an unstructured gridding method for DFN is avoided and computational complexity is greatly reduced. Thereby, the natural fractures in the single-well DFN geological model are processed by the EDFM formulation and translated into the reservoir numerical model. The P10, P50, and P90 DFN were processed for the single-well model. FIG. 15 shows the P50 DFN of the single-well model after EDFM characterization for well B-1. The inner zone fracture permeability is higher than the one from the outer region as calibrated with well testing.

Connectivity Analysis to Identify Shortest Paths.

Figure 16:
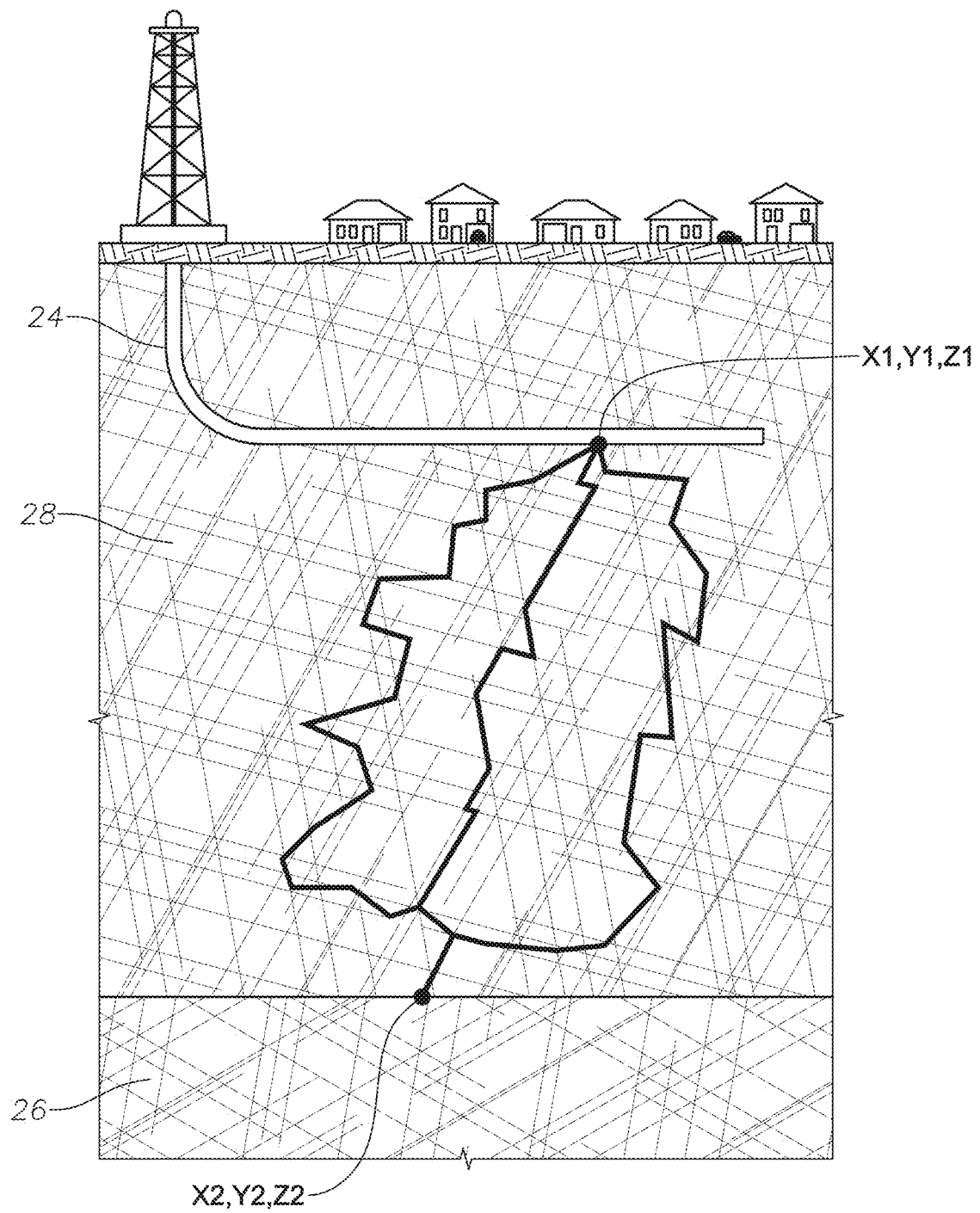
FIG. 16 depicts a schematic representation of shortest path identification from a wellbore to a water zone contact according to examples of the present disclosure.
Figure 17A:
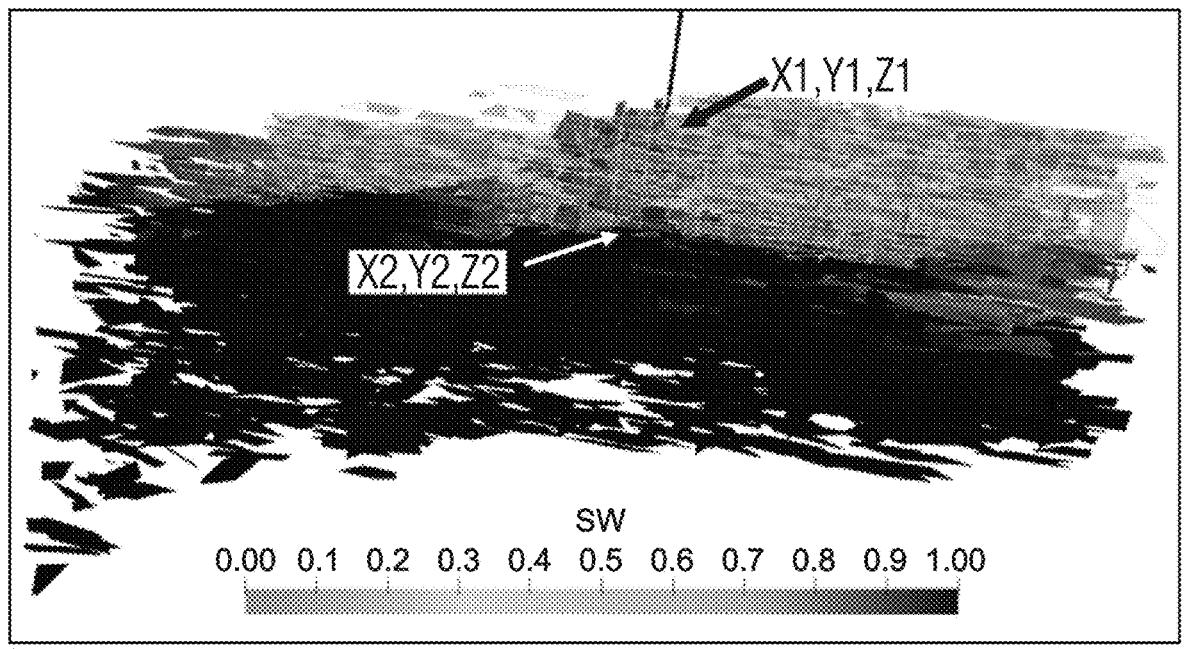
FIG. 17A depicts a visualization of a shortest path from a wellbore to a water zone contact in a water saturation setting within a DFN network according to examples of the present disclosure.
Figure 17B:
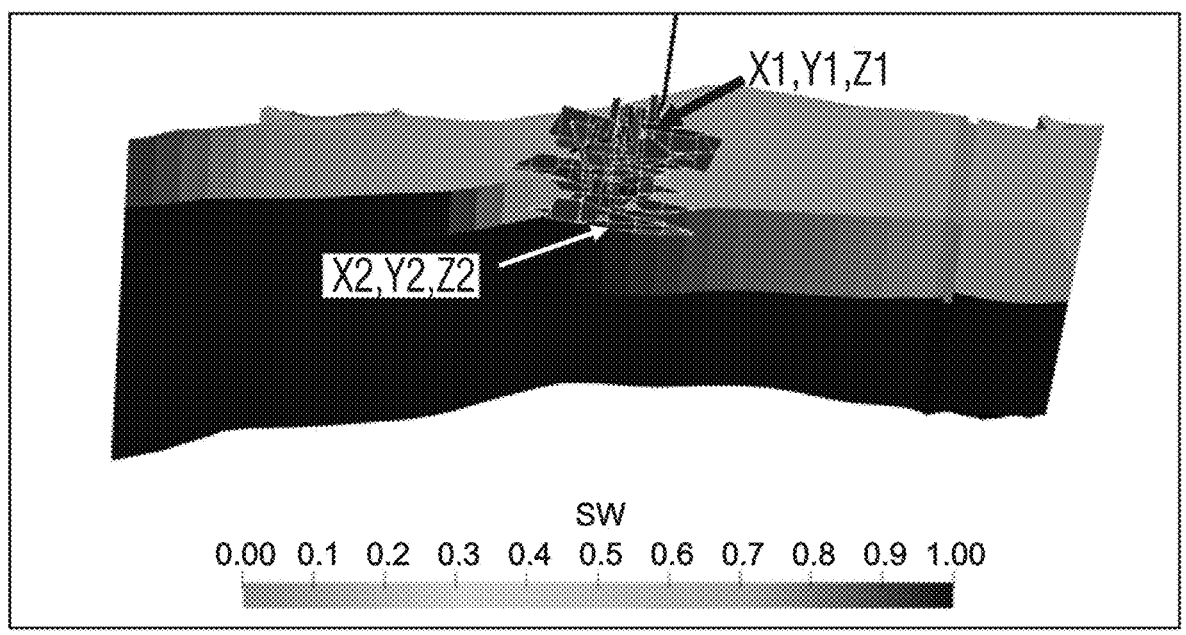
FIG. 17B depicts a visualization of a shortest path from a wellbore to a water zone contact in a water saturation setting next to a plane intersection of matrix blocks according to examples of the present disclosure.

A novel feature of embodiments of this disclosure is the performance of fracture geometrical connectivity analysis. In some embodiments, the shortest Euclidean distances between fracture-fracture intersections within the fracture network may be computed and multiple shortest paths can be screened from the whole DFN. For example, an embodiment may be implemented wherein dominant fractures whose properties will enhance the well interference and the water intrusion characterization are filtered. FIG. 16 shows a representation of shortest path identification between a wellbore 24 and a water zone contact 26 in a subsurface fracture network 28. The center path exhibits the lowest total distance between two points (X1, Y1, Z1-X2, Y2, Z2). FIG. 17A shows a visualization of the shortest path (dark grey fractures) from the wellbore to the water zone contact (black) in a water saturation (SW) setting within the DFN network. FIG. 17B shows a visualization of the shortest path (dark grey fractures) from the wellbore to the water zone contact (black) in a water saturation setting next to a plane intersection of the matrix blocks. This operation is unique to calibrate the DFN with posterior history matching of observed field production.

Computations for the connectivity analysis may be carried out via conventional methodologies. For example, embodiments may be implemented using an algorithm described by Yen's algorithm for multiple shortest paths, adapted to find the shortest distances from the wellbore to the water zone using the natural fractures in a reservoir as the flow medium. (Yen, J. (1971). Finding the K Shortest Looples Paths in a Network. Management Science, 17(11), 712-716. (www.jstor.org/stable/2629312). An applicable algorithm first identifies the shortest path from the initial node (wellbore) to the end node (water contact) (e.g. using Dijkstra's algorithm), and then iteratively finds subsequent different shortest paths in the fracture network. (Dijkstra, E. W. A note on two problems in connection with graphs. Numer. Math. 1, 269-271 (1959). (https://doi.org/10.1007/BF01386390).

Single Model Screening by History Matching.

Figure 18:
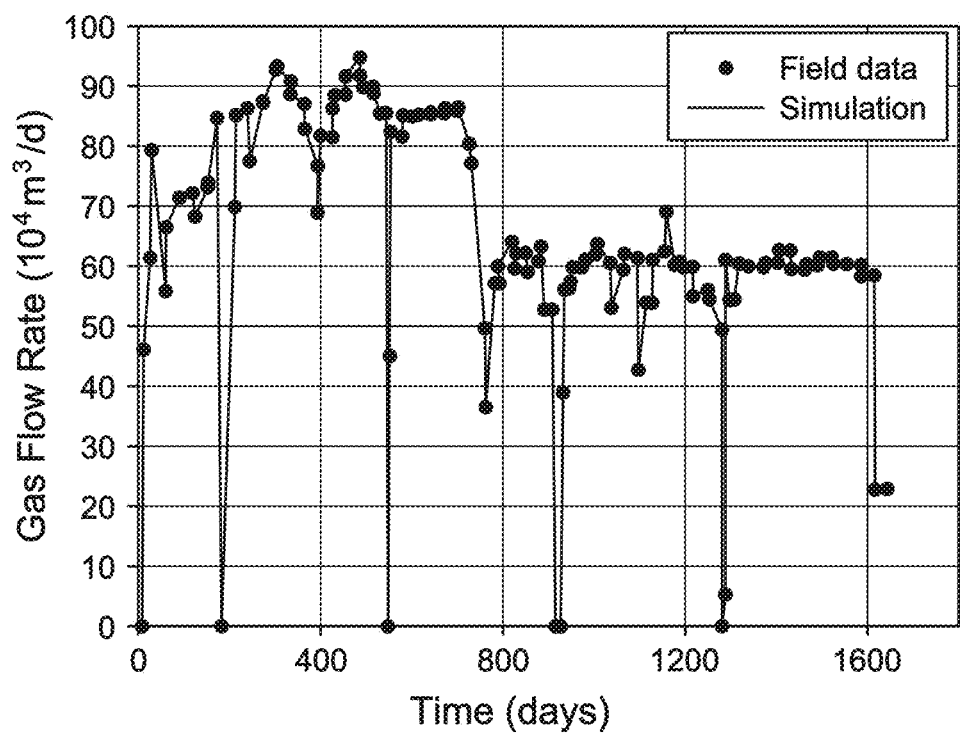
FIG. 18 depicts a plot of gas flow rates of well models according to examples of the present disclosure.
Figure 19:
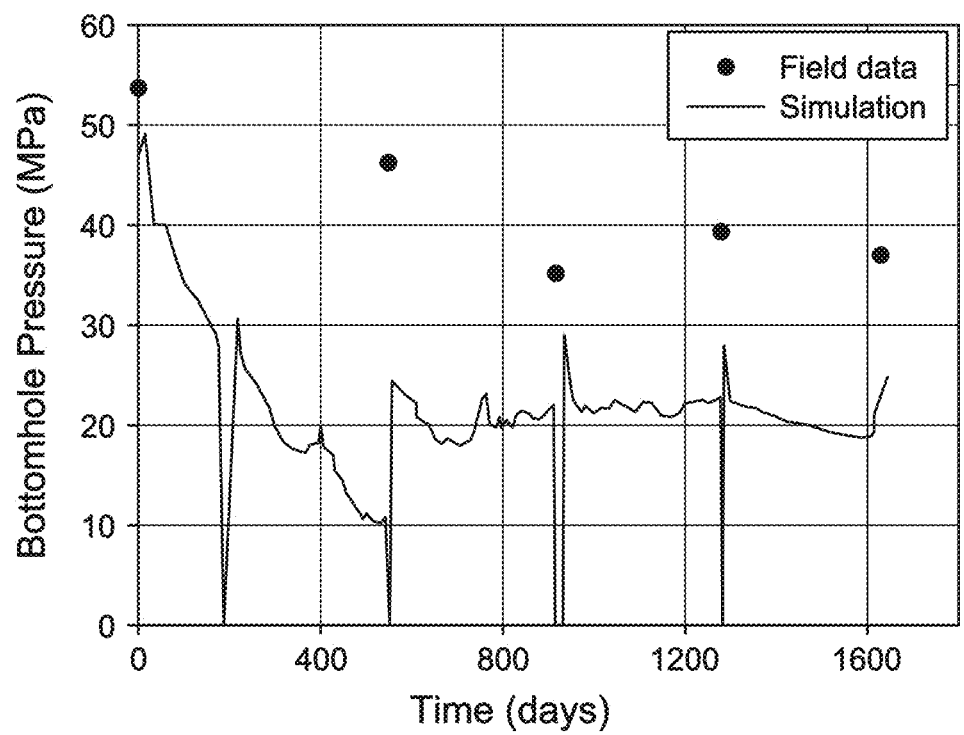
FIG. 19 depicts a plot of a flowing bottomhole pressure history match of a P10 model according to examples of the present disclosure.
Figure 20:
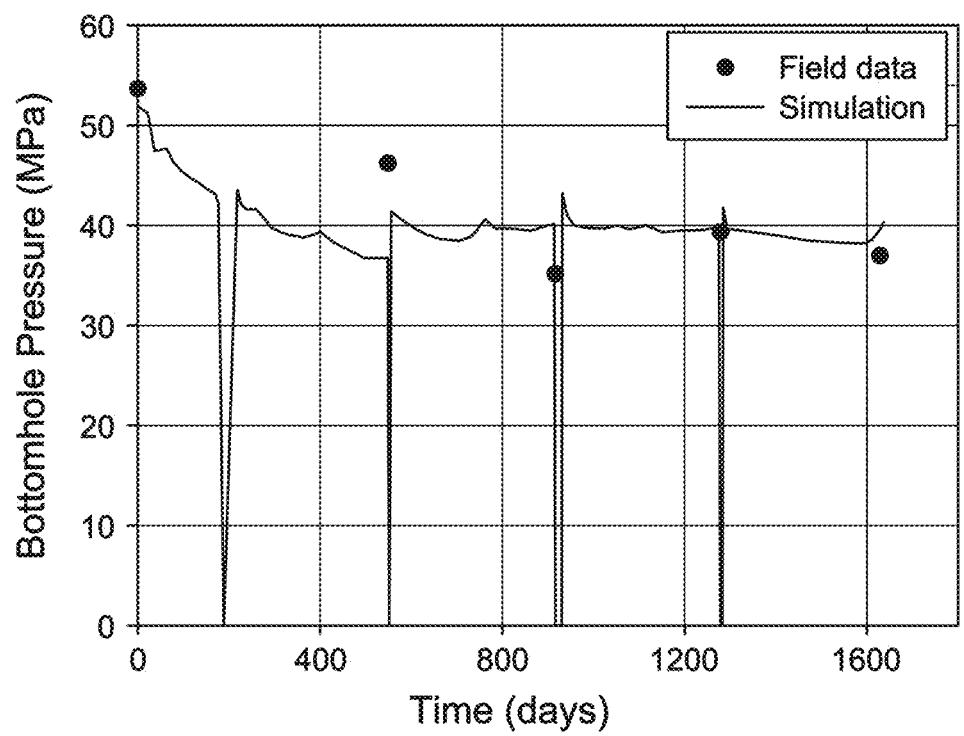
FIG. 20 depicts a plot of a flowing bottomhole pressure history match of a P50 model according to examples of the present disclosure.
Figure 21:
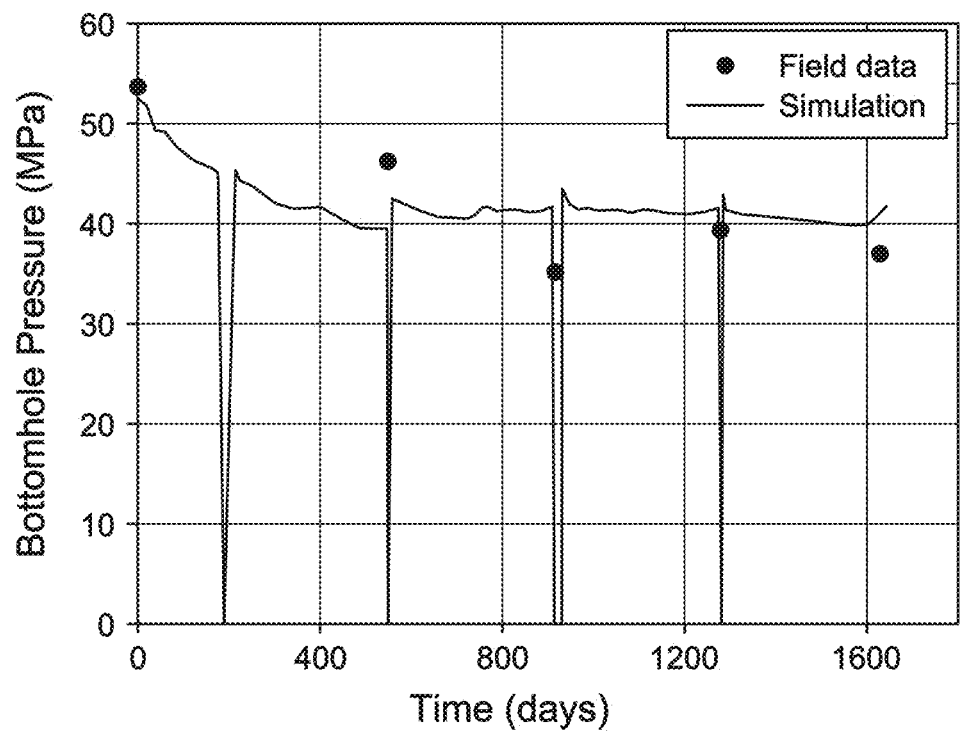
FIG. 21 depicts a plot of a flowing bottomhole pressure history match of a P90 model according to examples of the present disclosure.

In order to improve the reliability of the DFN model and reduce the history-match workload of the model, actual production data of single wells was employed to calibrate the DFN setting. Thus, numerical simulation was performed for the P10, P50, and P90 scenarios that were previously generated and modeled with EDFM. For instance, the gas flow rate was the control or simulation constraint for the simulation. FIG. 18 depicts the gas flow rates for all the models. Water production was minimal in this field and was ignored from the history match for the particular field case. The bottomhole pressure was the responsive parameter compared and matched with the historical data for well B-1 FIG. 19 depicts the bottomhole pressure match for the P10 model. FIG. 20 depicts the bottomhole pressure match for the P50 model. FIG. 21 depicts the bottomhole pressure match for the P90 model.

The different models of well B-1 yield different pressure behavior results after numerical reservoir simulation. The P50 geological model exhibits the best compliance, and is therefore selected as the most representative single-well geological and DFN model to be used as the definitive model for the subsequent well group modeling (large scale model). Therefore, the final 3D model resulted from progressive modifications applied to the geomodels and different DFN models, which were built from the sparse data collected from a single well and calibrated with initial numerical simulation of its historical data.

Extending a Representative DFN Model Into a Multiple Well Model.

Figure 22:
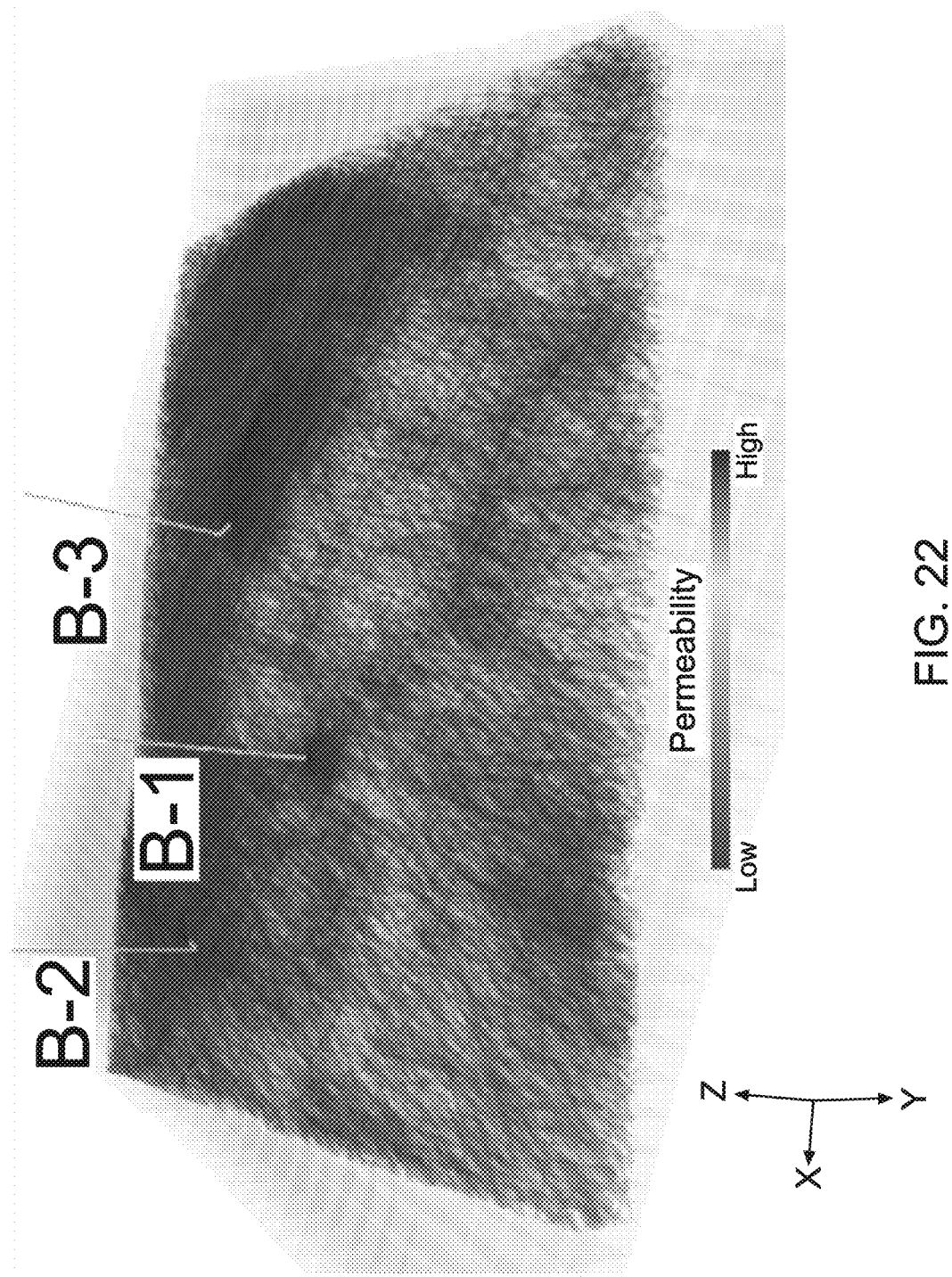
FIG. 22 depicts a 3D view of an extended discrete fracture network multiple well model according to examples of the present disclosure.

Based on the most representative single-well DFN and geological model of well B-1, which was obtained after a progressive screening described in the previous steps, the DFN group is up-scaled to a multiple well level by using seismic interpretation results (e.g., sedimentary microphases and ant tracking). The scaled-up model includes three production wells, which are B-1, B-2 and B-3 wells. The second B-2 well is relatively undeveloped because the well B-2 is located in a lower structural position. FIG. 22 shows a 3D view of the extended DFN multiple well model, containing 46,532 fractures. Close wellbore areas show higher fracture permeability. The DFN in FIG. 22 are displayed in greater transparency for better visualization.

History Match of the Multiple Well Model.

Figure 23:
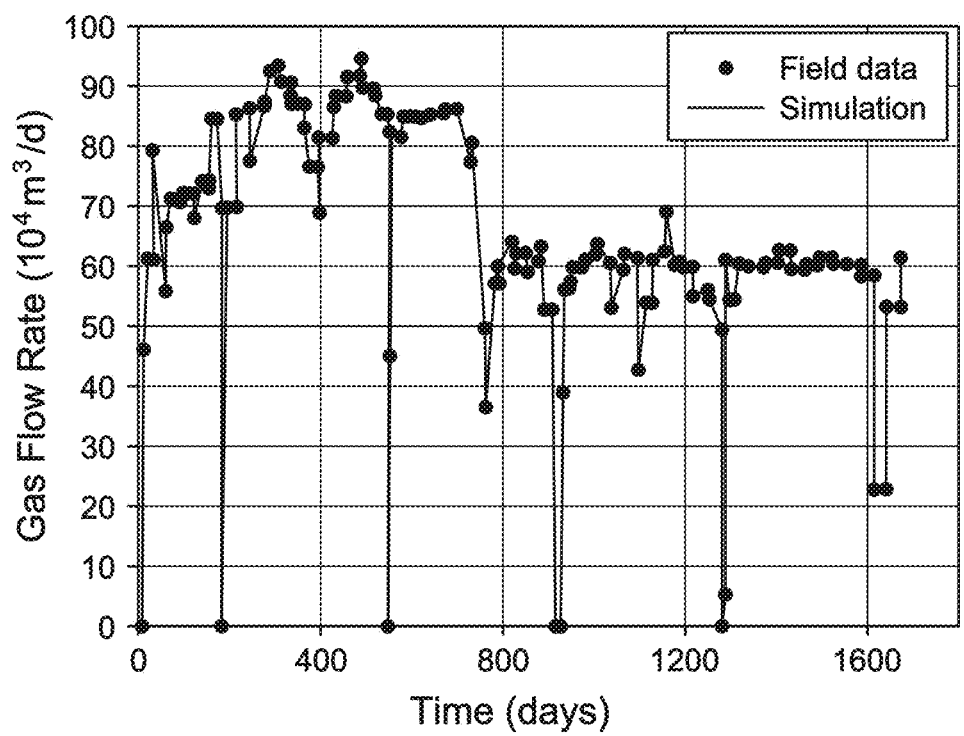
FIG. 23 depicts a gas flow rate plot of a well model according to examples of the present disclosure.
Figure 24:
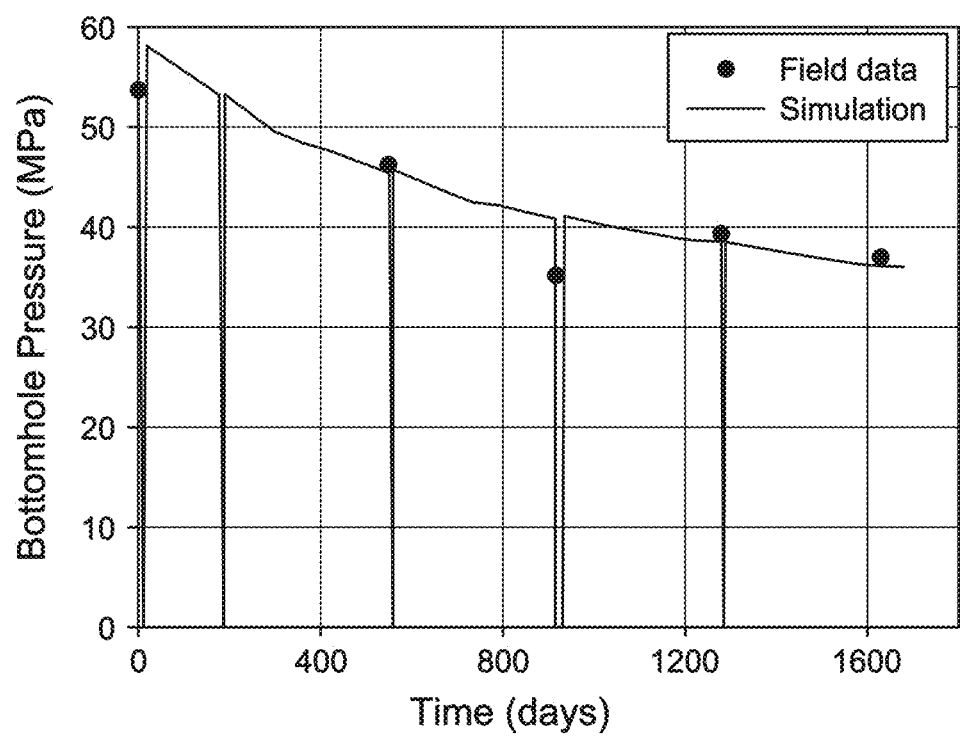
FIG. 24 depicts a plot of a flowing bottomhole pressure history match of the well of FIG. 23.
Figure 25:
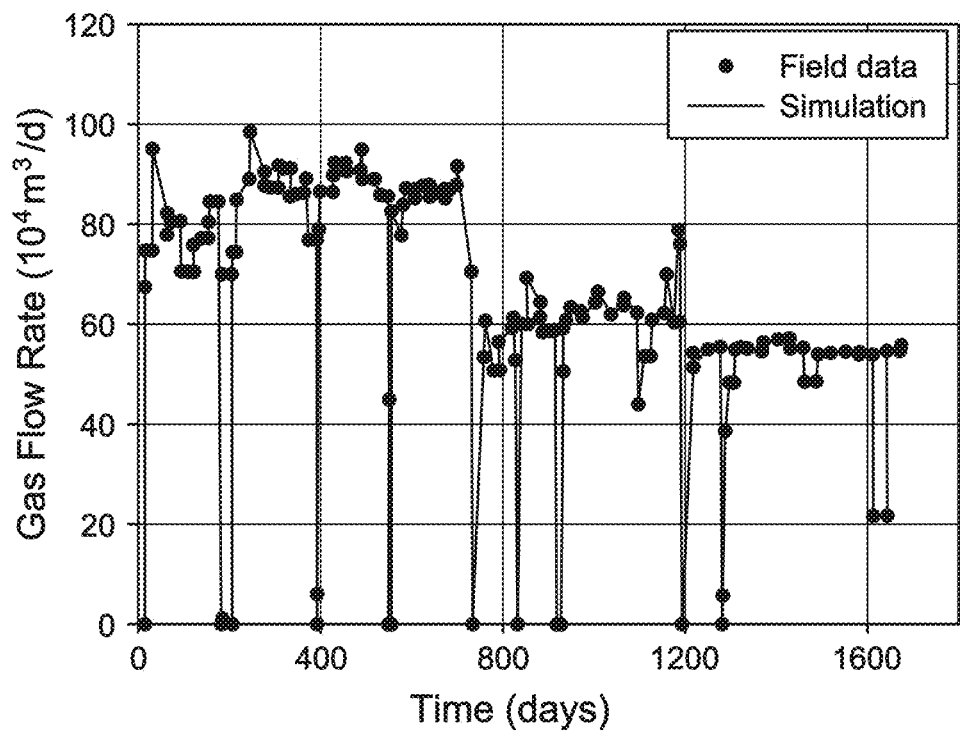
FIG. 25 depicts a gas flow rate plot of another well model according to examples of the present disclosure.
Figure 26:
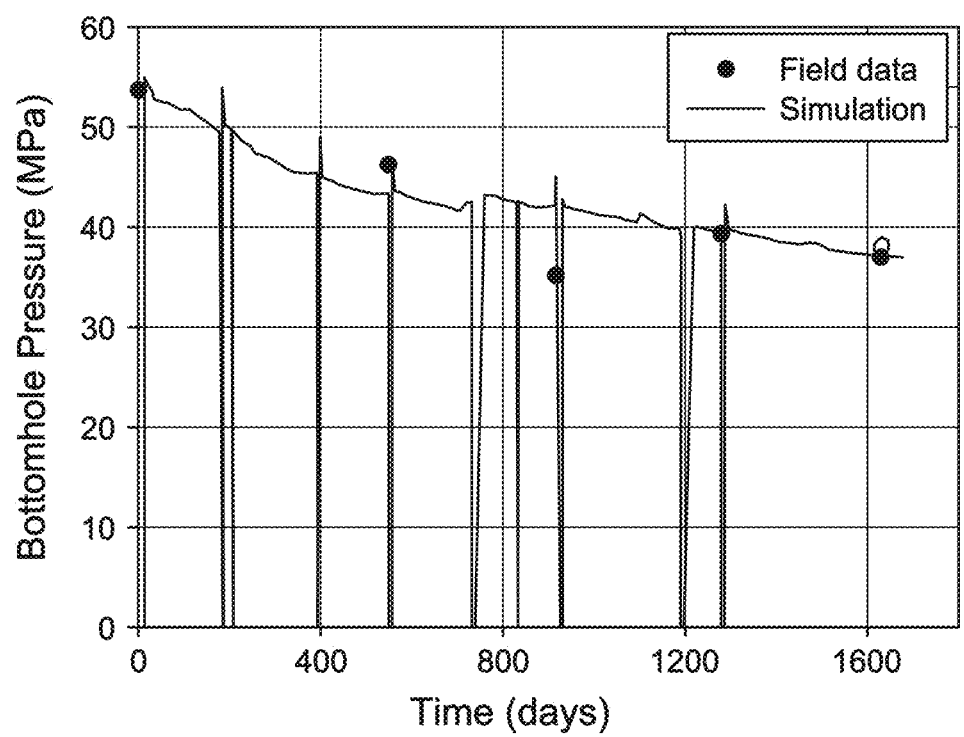
FIG. 26 depicts a plot of a flowing bottomhole pressure history match of the well of FIG. 25.
Figure 27:
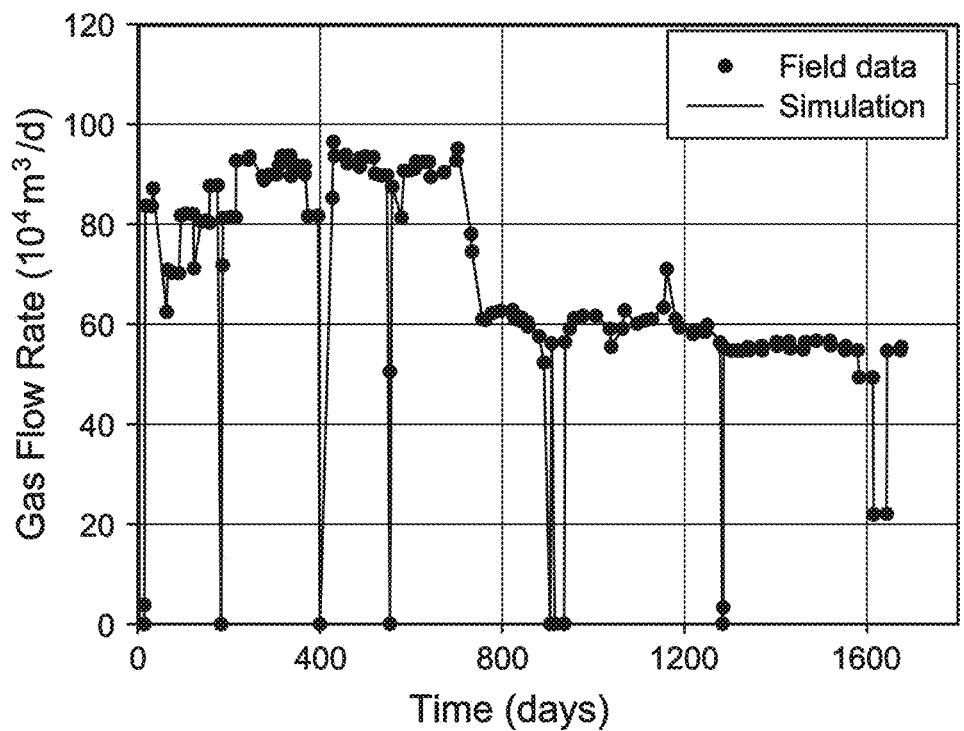
FIG. 27 depicts a gas flow rate plot of another well model according to examples of the present disclosure.
Figure 28:
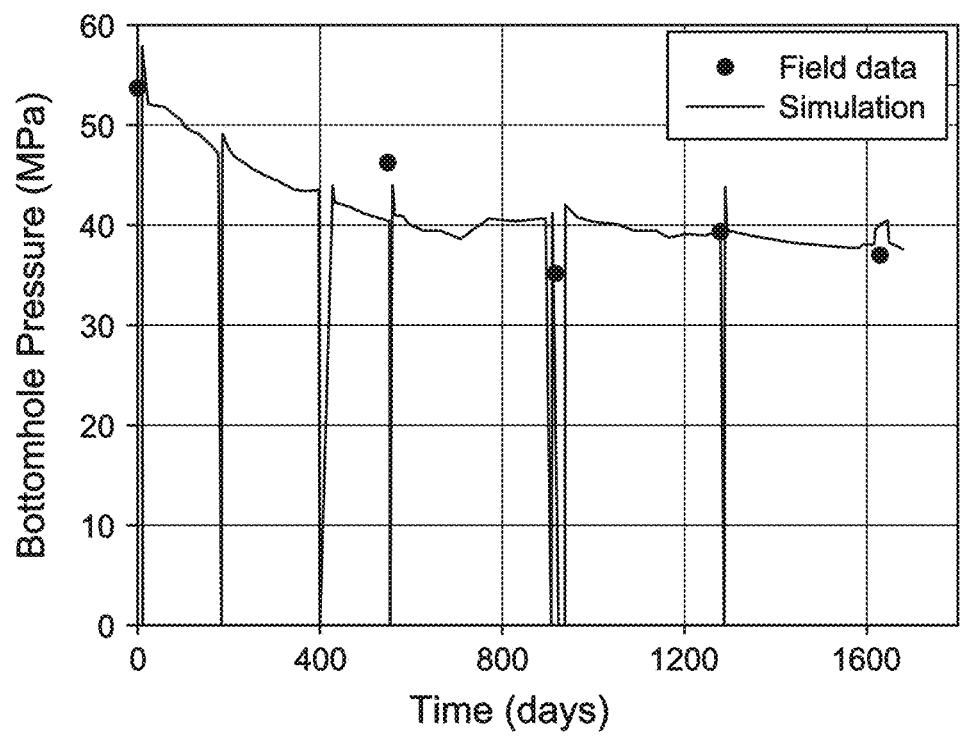
FIG. 28 depicts a plot of a flowing bottomhole pressure history match of the well of FIG. 27.

The three-well model history match process is carried out through reservoir numerical simulation. Actual production data and the scaled up DFN model were merged together to evaluate the dynamic response of the models. As in the previous single-well model calibration, the gas rate was the control of the simulation, while the bottomhole pressure was the responsive parameter to be matched. As a result, flowing showed satisfactory simulation response. The final history match results of the multiple well (B-1, B-2, B-3) numerical models are presented in FIGS. 23-28. FIG. 23 shows the gas flow rate for well B-1. FIG. 24 shows the flowing bottomhole pressure history match of well B-1. FIG. 25 shows the gas flow rate for well B-2. FIG. 26 shows the flowing bottomhole pressure history match of well B-2. FIG. 27 shows the gas flow rate for well B-3. FIG. 28 shows the flowing bottomhole pressure history match of well B-3. Hence, this final step shows how the disclosed workflow validates the initial DFN calibration and reinforces the reliability for accurate production management and upcoming behavior prediction of the region of the studied wells.

Figure 29:
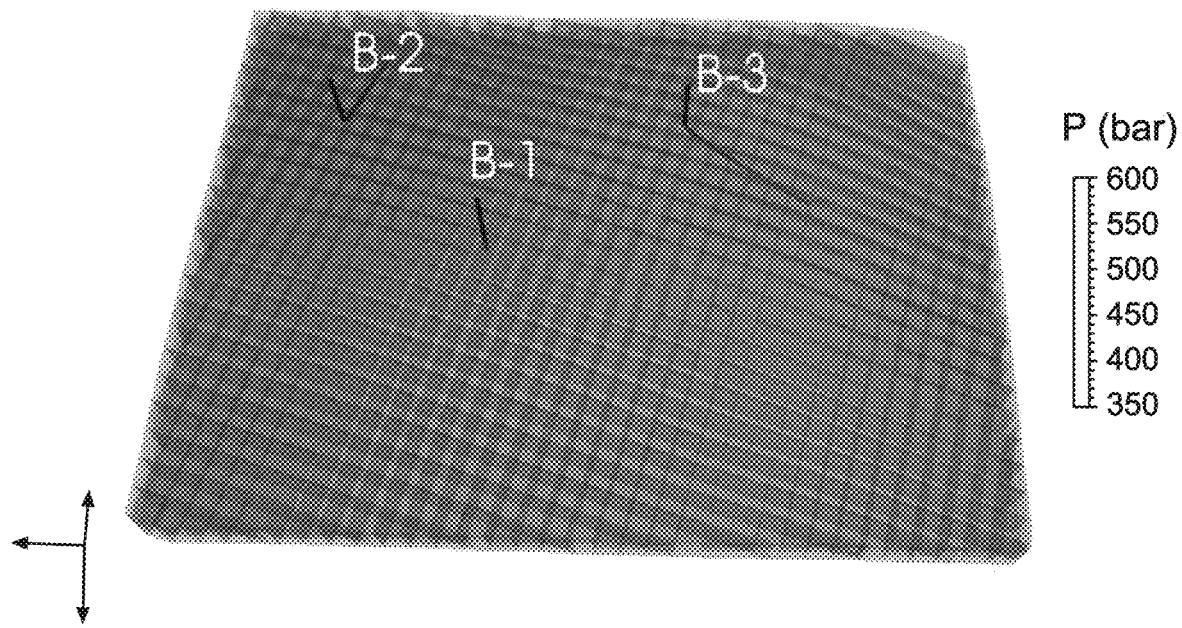
FIG. 29 depicts a schematic of a pressure distribution in a field matrix grid at zero days of production according to examples of the present disclosure.
Figure 30:
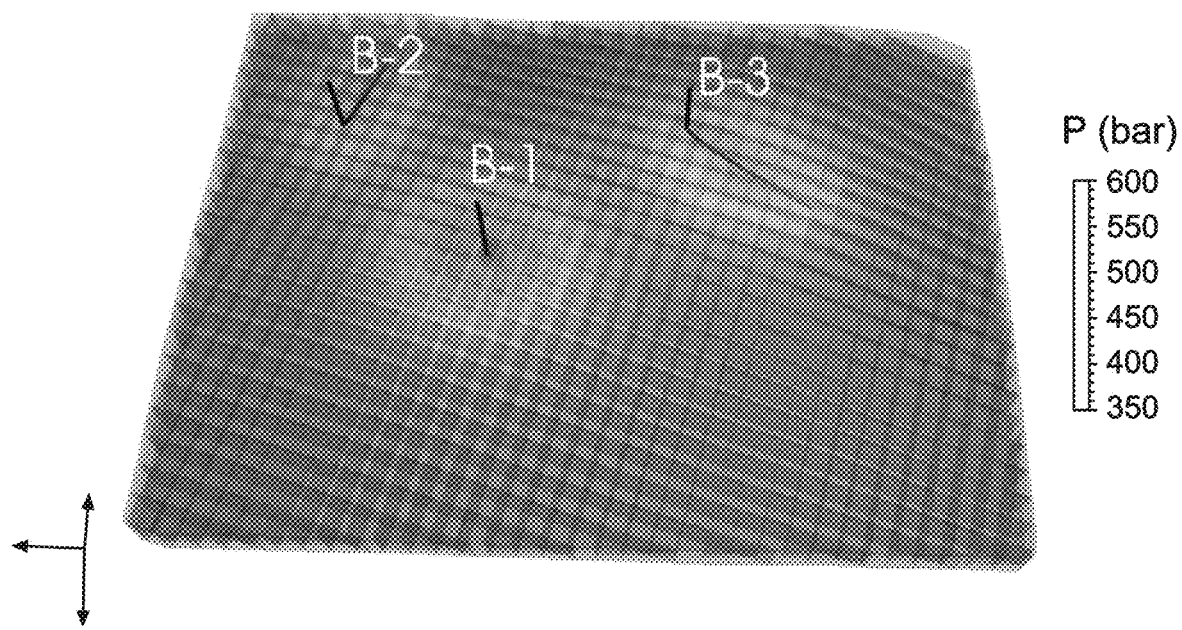
FIG. 30 depicts a schematic of a pressure distribution in the field matrix grid of FIG. 29 at sixteen hundred days of production.
Figure 31:
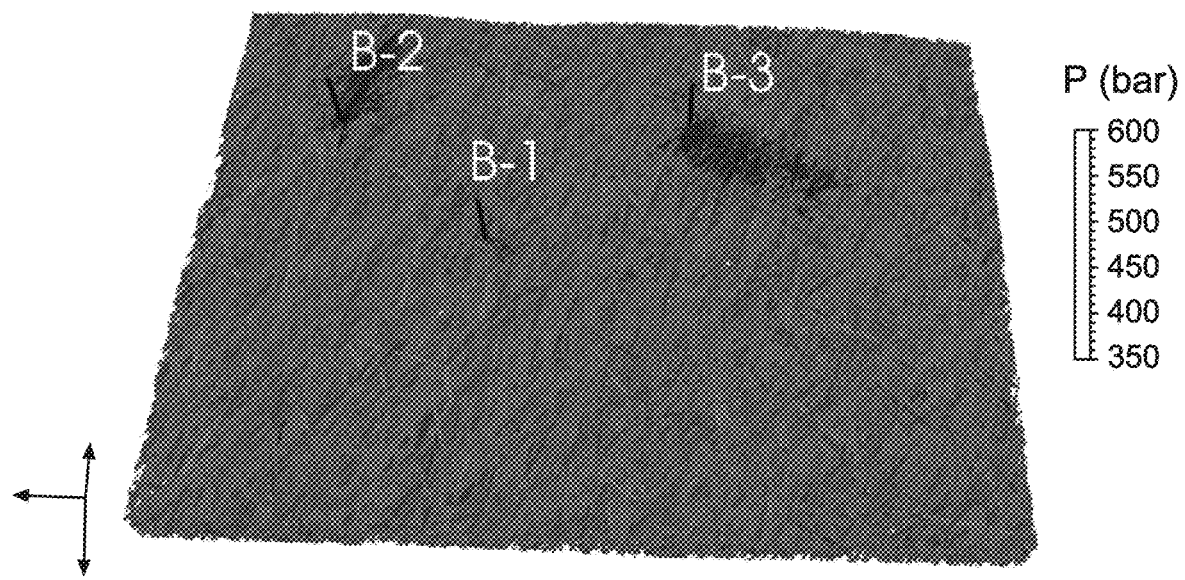
FIG. 31 depicts a schematic of a pressure distribution of fractures through a discrete fracture network at zero days of production according to examples of the present disclosure.
Figure 32:
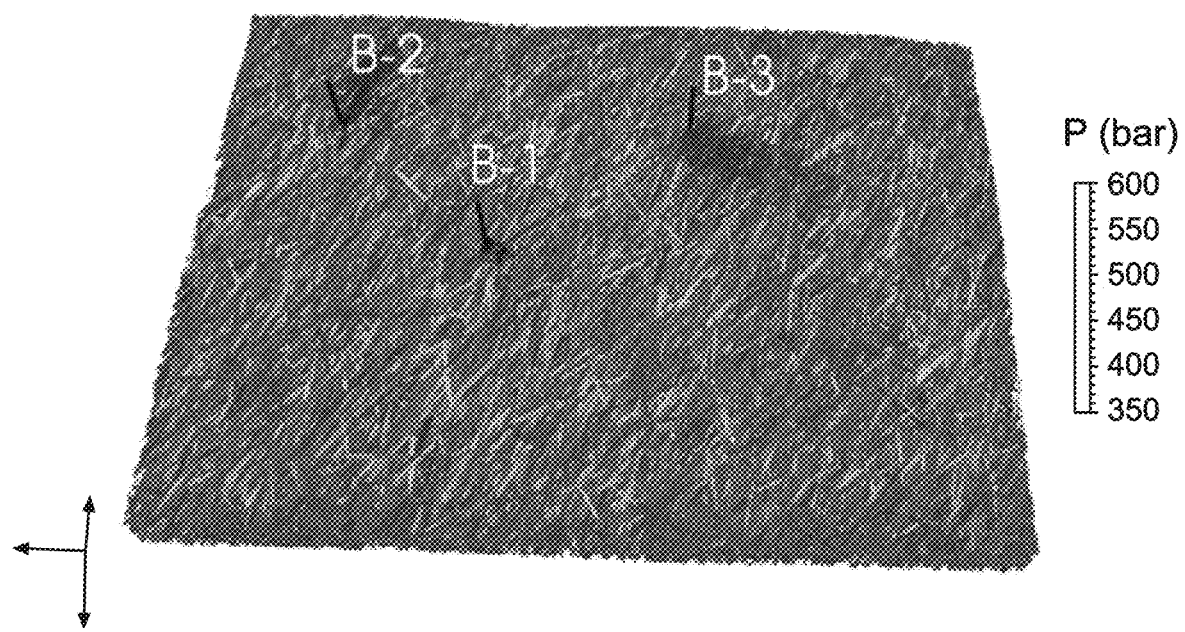
FIG. 32 depicts a schematic of a pressure distribution of fractures through a discrete fracture network in the field of FIG. 31 at sixteen hundred days of production.
Figure 33:
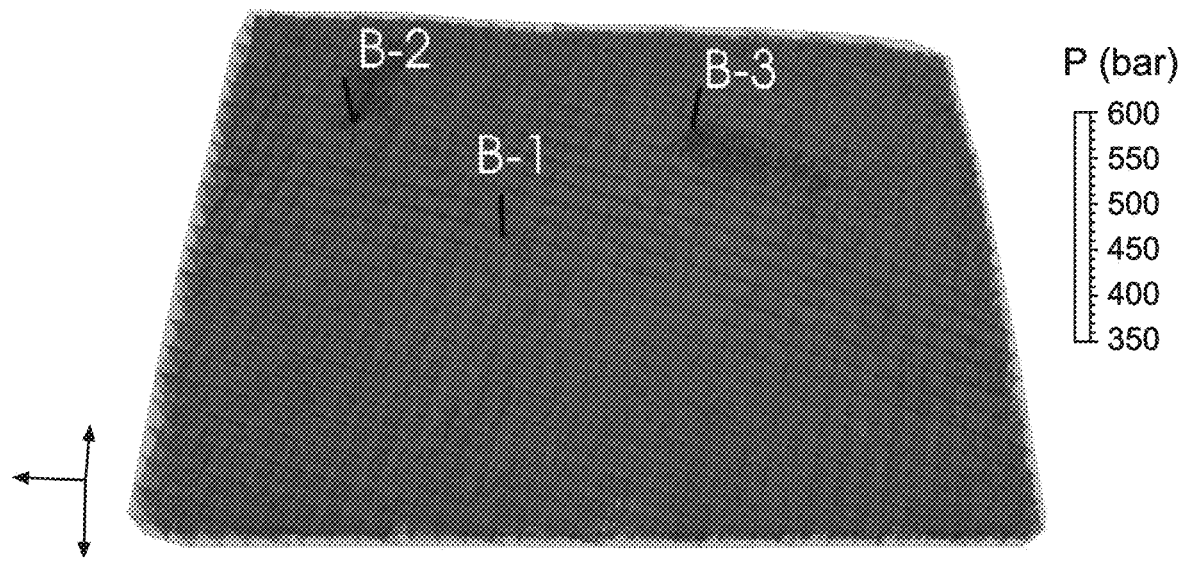
FIG. 33 depicts a schematic of a stacking pressure distribution of fractures and matrix through a discrete fracture network at zero days of production according to examples of the present disclosure.
Figure 34:
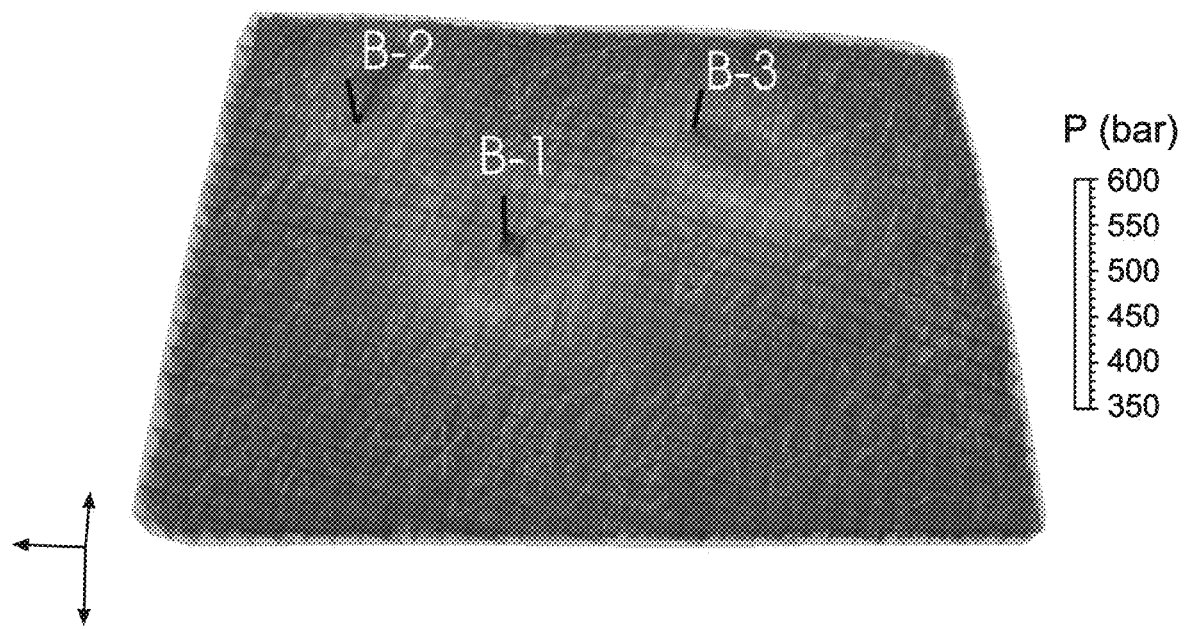
FIG. 34 depicts a schematic of a stacking pressure distribution of fractures and matrix through a discrete fracture network in the field of FIG. 33 at sixteen hundred days of production.

Comparison of pressure distribution in the matrix grid at 0 days of production is depicted in FIG. 29 and at 1600 days of production in FIG. 30. Likewise, comparison of pressure distribution only through the DFN natural fractures at 0 days of production is depicted in FIG. 31 and at 1600 days of production in FIG. 32. Finally, a comparison of pressure distribution through DFN and the matrix at 0 days of production is depicted in FIG. 33 and at 1600 days of production in FIG. 34. The effects of DFN dominant fractures on drainage area and efficiency can be clearly observed.

Figure 35:
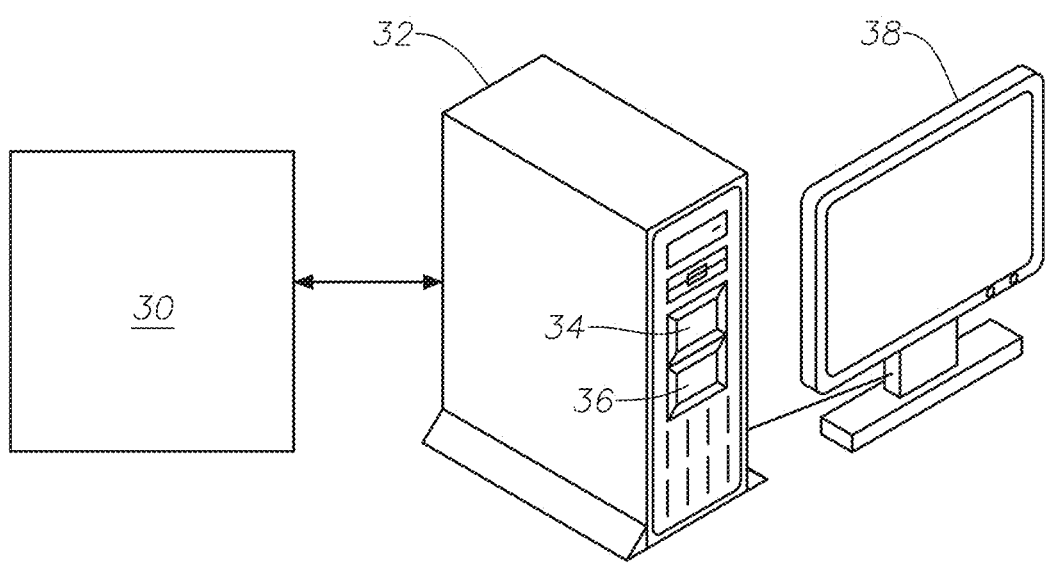
FIG. 35 shows a schematic of a system according to examples of the present disclosure.

FIG. 35 depicts a system embodiment of this disclosure. A software module 30 is linked to a computer 32 configured with a microprocessor 34 and memory 36. The module 30 is configured with the applications described herein and programmed for the computer 32 to perform the steps and processes disclosed herein for generation of the desired calibration and simulation. The EDFM formulation keeps the grids of conventional simulators and models the fractures implicitly through different types of connection factors as described herein, without requiring access to or use of the simulator's source code. Embodiments may be implemented with the module 30 comprising all of the software as a unitary application or configured to run the respective applications as uploaded by the user. A display 38 is linked to the computer 32 to provide a visual output of the calibration simulation results. It will be appreciated by those skilled in the art that conventional software and computer systems may be used to implement the aspects of this disclosure. It will also be appreciated that programming of the module 30, computer 32, and microprocessor 34 can be implemented via any suitable computer language coding in accordance with the techniques disclosed herein. The computer 32 may also include, for example, a mobile phone, a tablet, a laptop computer, a desktop computer, an electronic notepad, a server computing device, etc.

Advantages provided by the embodiments of this disclosure include presentation of new techniques for DFN calibration through well testing and faster numerical reservoir simulation enhanced by EDFM processing, so that more of these dynamic data can be employed to improve the accuracy of fracture characterization and reduce the workload of the history matching numerical fractured reservoir models. The disclosed calibration workflow aids to define the most representative DFN that history matches the production and pressure behavior of the reservoir. This DFN calibration can provide a precise foundation in a faster manner for modeling complex subsurface fractured systems. The calibration of multiple DFN realizations takes into account more dynamic data than conventional DFN fracture modeling because it includes well testing interpretation and production analysis.

The included results of pressure buildup from well testing has a tremendous impact as a constrained condition for the natural fractured oil and gas reservoir because these results further improve the precision of the fracture transmissibility prediction regarding different regions. Although uncertainty about the accuracy of multiple DFN stochastic models cannot be verified, it can be mitigated through the disclosed workflow through the process of "preliminary history matching" of production data and specified minimum match criteria as the screening criteria, reducing the human meddling on initial parameters, and thus, providing a more reliable DFN for reservoir engineers. The EDFM formulation facilitates calibration of multiple DFN realizations efficiently since it can translate any DFN scenario into the reservoir simulation particularly fast and with higher flexibility than traditional methods, which are limited and cannot capture the fracture geometries and fracture intensity explicitly. The disclosed techniques achieve successful results after using only the comprehensive data of a single well to calibrate and propagate the DFN characterization of further areas of the geological model of the field (including other wells with much less available information). Thus, it can be concluded that the disclosed embodiments can be applied in fractured oil and gas reservoirs with wells that present a lack of data. Other advantages provided by the disclosed embodiments include the ability to: transfer the fracture geometry generated from microseismic data interpretation to commercial numerical reservoir simulators for production simulation; transfer the fracture geometry generated from fracture modeling and characterization software to commercial numerical reservoir simulators for production simulation without the need of upscaling the fracture properties to the grid; and handle pressure-dependent matrix permeability and pressure-dependent fracture permeability. The disclosed embodiments are computationally robust and easily adaptable to different scenarios, and can be extended to subsequent optimization for unconventional-resources development.

In light of the principles and example embodiments described and illustrated herein, it will be recognized that the example embodiments can be modified in arrangement and detail without departing from such principles. For example, alternative embodiments may include processes that use fewer than all of the disclosed operations, processes that use additional operations, and processes in which the individual operations disclosed herein are combined, subdivided, rearranged, or otherwise altered. Embodiments may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware. It will also be appreciated by those skilled in the art that embodiments may be implemented using conventional memory in applied computing systems (e.g., local memory, virtual memory, and/or cloud-based memory). The term "processor" may refer to one or more processors. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

Nomenclature

A=area, ft
B=formation volume factor
c=compressibility, $psi^{-1}$
$C_f$=fracture conductivity, md-ft
d=average distance, ft
dS=area element, $ft^2$
dV=volume element, $ft^3$
H=fracture height, ft
$H_s$=height of fracture segment, ft
k=reservoir permeability, md
$k_f$=fracture permeability, md
K=matrix permeability tensor, md
$K_a$=differential equilibrium portioning coefficient of gas at a constant temperature
L=fracture length, ft
$L_{int}$=length of fracture intersection line, ft
$L_s$=length of fracture segment, ft
$\vec{n}$=normal vector
N=number of nnc
p=pressure, psi
Q=volume flow rate, $ft^3$/day
re=effective radisu, ft
rw=wellbore radius, ft
$R_S$=solution gas-oil ratio, scf/STB
S=fracture segment area, $ft^2$
T=transmissibility, md-ft or temperature, ° F.
V=volume, $ft^3$
$V_b$=bulk volume, $ft^3$
$V_m$=langmuir isotherm constant, scf/ton
$w_f$=fracture aperture, ft
$\overline{w_f}$=average fracture aperture, ft
WI=well index, md-ft
x=distance, ft
$x_f$=fracture half length, ft
Δp=pressure drop, psi
λ=phase mobility, $cp^{-1}$
μ=viscosity, cp
ρ=density, $g/cm^3$
$\phi_f$=fracture effective porosity Subscripts and Superscripts a=adsorbed
b=bulk
c=common face
eff=effective
f=fracture
g=gas
j=phase
L=Langmuir
m=matrix
o=oil
seg=fracture segment
ST=stock tank

APPENDIX A

Derivation of Matrix-Fracture Transmissibility Factor

As shown in FIG. 2, the matrix cell is divided into 2 parts: A and B. We denote the volume of part A and part B as $V_A$ and $V_B$, respectively. The average pressure in the total matrix cell is $$p_m=(V_A p_A+V_B p_B)/(V_A+V_B), \tag{A1}$$

where $p_A$ and $p_B$ are the average pressure in part A and B, respectively. We assume the same pressure gradients in A and B as shown by the red arrows. Let $d_A$ and $d_B$ be the average normal distances from part A and part B to the fracture plane. The flow rate of phase j from the fracture surface 1 to part A is $$Q_{f-A} = T_{f-A} \lambda_j (p_f - p_A), \quad (A2)$$

where $p_f$ is the average pressure in the fracture segment, $T_{f-A}$ is the phase independent part of transmissibility between fracture and part A, and $\lambda_j$ is the relative mobility of phase j. $T_{f-A}$ can be calculated by $$T_{f-A} = A_f (K \cdot \vec{n}) \cdot \vec{n} / d_{f-A}, \quad (A3)$$

where $A_f$ is the area of the fracture segment on one side, K is the matrix permeability tensor, d is the normal vector of the fracture plane, $d_{f-A}$ is the average normal distance from part A to fracture, which can be calculated by $$d_{f-A} = \frac{\int_{V_A} x_n dV_A}{V_A}, \quad (A4)$$

$(p_f - p_A) \vec{n} / d_{f-A}$ is the pressure gradient. In the case of anisotropic matrix permeability, the flow direction may be different from the direction of pressure gradient. Therefore, the second $\vec{n}$ in the equation projects the flow velocity onto the normal direction of the fracture plane. Similarly, the flow rate of phase j from the fracture surface 2 to part B is $$Q_{f-B} = T_{f-B} \lambda_j (p_f - p_B), \quad (A5)$$

$$T_{f-B} = A_f (K \cdot \vec{n}) \cdot \vec{n} / d_{f-B}, \quad (A6)$$

and $$d_{f-B} = \frac{\int_{V_B} x_n dV_B}{V_B}. \quad (A7)$$

The total flow from fracture to matrix is $$Q_{f-m} = Q_{f-A} + Q_{f-B}. \quad (A8)$$

By the definition of $T_{f-m}$, $$Q_{f-m} = T_{f-m} \lambda_j (p_f - p_m). \quad (A9)$$

Assuming the same magnitude of pressure gradients on both sides of the fracture, we have $$\frac{p_f - p_A}{p_f - p_B} = \frac{d_{f-A}}{d_{f-B}}. \quad (A10)$$

Combining all these equations, we can obtain $$T_{f-m} = \frac{2 A_f (K \cdot \vec{n}) \cdot \vec{n}}{(V_A d_{f-A} + V_B d_{f-B})(V_A + V_B)}. \quad (A11)$$

What is claimed is:

1. A method for calibrating a simulation of a subterranean region having fracture geometries, comprising:
accessing, by a processor, a digital simulator module to obtaining discrete fracture network data representing characteristics of the subterranean region;
producing, by the processor, a computational domain;
calibrating, in the computational domain, the discrete fracture network data using well test data representing at least one well in the subterranean region;
applying, in the computational domain, an EDFM formulation to the calibrated discrete fracture network data to produce model data;
identifying, in the computational domain, fracture shortest paths between multiple points within the discrete fracture network data using the produced model data;
performing, in the computational domain, a history matching operation to select a data set from the produced model data; and
generating a simulation of the subterranean region using the processor to input the selected data set into the simulator module, the simulation including applications wherein the discrete fracture network data represents a subterranean region with one or more wells that present a lack of data.

2. The method of claim 1 wherein the discrete fracture network data represents a single well in the subterranean region, and the generated simulation represents a plurality of wells in the subterranean region.

3. The method of claim 1 wherein the discrete fracture network data comprises data representing multiple single-well discrete fracture networks.

4. The method of claim 1 wherein the discrete fracture network data comprises at least one of a P10, P50, or P90 scenario.

5. The method of claim 4 wherein the applying an EDFM formulation comprises applying the formulation to at least one of the P10, P50, or P90 scenarios.

6. The method of claim 1 wherein the performing a history matching operation comprises using well production data in the matching.

7. The method of claim 1 wherein the performing a history matching operation comprises determining if the produced model data meets specified criteria to select the data set from the produced model data.

8. The method of claim 7 wherein the specified criteria comprises a matching degree of more than fifty percent.

9. The method of claim 1 wherein the generating a simulation of the subterranean region comprises using seismic interpretation data to generate the simulation.

10. The method of claim 1 wherein the applying an EDFM formulation to produce model data comprises production of data representing fracture characteristics.

11. The method of claim 1 wherein generating a simulation of the subterranean region comprises generating a visualization of static and dynamic properties along fractures in a matrix.

12. A system for calibration of a simulation of a subterranean region having fracture geometries, comprising:
at least one processor configured to execute computer instructions to perform functions including to:
get discrete fracture network data from a digital simulator module, the data representing characteristics of the subterranean region;
produce a computational domain;
calibrate, in the computational domain, the discrete fracture network data using well test data representing at least one well in the subterranean region;
apply, in the computational domain, an EDFM formulation to the calibrated discrete fracture network data to produce model data;

identify, in the computational domain, fracture shortest paths between multiple points within the discrete fracture network data using the produced model data;

perform, in the computational domain, a history matching operation to select a data set from the produced model data;

input the selected data set from the computational domain into the digital simulator module; and generate a simulation of the subterranean region with the digital simulator module using the selected data set, wherein the simulation includes applications wherein the discrete fracture network data represents a subterranean region with one or more wells that present a lack of data.

13. The system of claim 12 wherein the discrete fracture network data represents a single well in the subterranean region, and the generated simulation represents a plurality of wells in the subterranean region.

14. The system of claim 12 wherein the discrete fracture network data comprises data representing multiple single-well discrete fracture networks.

15. The system of claim 12 wherein the function to get discrete fracture network data comprises acquisition of data including at least one of a P10, P50, or P90 scenario.

16. The system of claim 15 wherein the function to apply an EDFM formulation comprises application of the formulation to at least one of the P10, P50, or P90 scenarios.

17. The system of claim 12 wherein the function to perform a history matching operation comprises use of well production data in the matching.

18. The system of claim 12 wherein the function to perform a history matching operation comprises a determination if the produced model data meets specified criteria to select the data set from the produced model data.

19. The system of claim 18 wherein the specified criteria comprises a matching degree of at least fifty percent.

20. The system of claim 18 wherein the specified criteria comprises a matching degree of at least seventy percent.

21. The system of claim 12 wherein the function to generate a simulation of the subterranean region comprises use of seismic interpretation data to generate the simulation.

22. The system of claim 12 wherein the function to apply an EDFM formulation to produce model data comprises production of data representing fracture characteristics.

23. The system of claim 12 wherein the function to generate a simulation of the subterranean region comprises generation of a visualization of static and dynamic properties along fractures in a matrix.

24. A system for calibration of a simulation of a subterranean region having fracture geometries, comprising:

at least one processor configured to execute computer instructions to perform functions including to:

generate and select P10, P50, and P90 scenario data from data representing multiple subterranean single-well discrete fracture networks;

produce a computational domain;

calibrate, in the computational domain, the selected P10, P50, and P90 scenario data using well test data;

apply, in the computational domain, an EDFM formulation to the calibrated P10, P50, and P90 scenario data to produce model data for each scenario;

identify, in the computational domain, fracture shortest paths between multiple points using the produced model data;

perform, in the computational domain, a history matching operation with the P10, P50, and P90 scenarios using well production data;

select, in the computational domain, a data set from the P10, P50, or P90 scenarios with a history matching degree meeting a specified criterion;

characterize, in the computational domain, a multiple-well model using the selected data set; and generate a simulation of the multiple-well model, wherein the simulation includes applications wherein the discrete fracture networks data represents a subterranean region with one or more wells that present a lack of data.

* * * * *

UNITED STATES PATENT AND TRADEMARK OFFICE
CERTIFICATE OF CORRECTION

PATENT NO. : 11,320,555 B2
APPLICATION NO. : 16/895650
DATED : May 3, 2022
INVENTOR(S) : Jijun Miao et al.

It is certified that error appears in the above-identified patent and that said Letters Patent is hereby corrected as shown below:

On the Title Page

Item (12), should read --Miao et al.--.

Item (72), "Jijun Mlao" should read --Jijun Miao--.

Signed and Sealed this
Seventh Day of June, 2022

Katherine Kelly Vidal
*Director of the United States Patent and Trademark Office*